(12) United States Patent
Dam et al.

(10) Patent No.: US 9,709,789 B2
(45) Date of Patent: Jul. 18, 2017

(54) INFRARED UP-CONVERSION MICROSCOPE

(71) Applicant: Danmarks Tekniske Universitet, Lyngby (DK)

(72) Inventors: Jeppe Seidelin Dam, Kgs. Lyngby (DK); Christian Pedersen, Hvidovre (DK); Nicolai Højer Sanders, Tåstrup (DK); Peter Tidemand-Lichtenberg, Høsholm (DK)

(73) Assignee: DANMARKS TEKNISKE UNIVERSITET, Lyngby (DK)

( * ) Notice: Subject to any disclaimer, the term of this patent is extended or adjusted under 35 U.S.C. 154(b) by 0 days.

(21) Appl. No.: 14/760,694

(22) PCT Filed: Jan. 31, 2014

(86) PCT No.: PCT/DK2014/050021
§ 371 (c)(1),
(2) Date: Jul. 13, 2015

(87) PCT Pub. No.: WO2014/117782
PCT Pub. Date: Aug. 7, 2014

(65) Prior Publication Data
US 2015/0355447 A1    Dec. 10, 2015

(30) Foreign Application Priority Data
Jan. 31, 2013  (EP) .................................. 13153491

(51) Int. Cl.
*G02B 21/06* (2006.01)
*G02F 1/35* (2006.01)
(Continued)

(52) U.S. Cl.
CPC ........... *G02B 21/06* (2013.01); *G02B 21/002* (2013.01); *G02B 21/0004* (2013.01);
(Continued)

(58) Field of Classification Search
CPC ......... G02F 1/35; G02F 1/3551; G02B 23/12; G01J 1/58; G01J 3/2823; H04N 5/33
See application file for complete search history.

(56) References Cited

U.S. PATENT DOCUMENTS 3,629,602 A    12/1971  Firester
3,914,618 A    10/1975  Harris
(Continued)

FOREIGN PATENT DOCUMENTS

EP    0 015 682 A1    9/1980
EP    0 571 972 A2    12/1993
(Continued)

OTHER PUBLICATIONS

Fujino, Tatsuya et al., "Femtosecond Fluorescence Up-Conversion Microscopy: Exciton Dynamics in α-Perylene Microcrystal" J. Phys. Chem. B, 2003, pp. 5120-5122, vol. 107.
(Continued)

*Primary Examiner* — Daniel Petkovsek
(74) *Attorney, Agent, or Firm* — Knobbe Martens Olson & Bear LLP

(57) ABSTRACT

There is presented an up-conversion infrared microscope (110) arranged for imaging an associated object (130), wherein the up-conversion infrared microscope (110) comprises a non-linear crystal (120) arranged for up-conversion of infrared electromagnetic radiation, and wherein an objective optical component (100) has an entrance pupil with a first diameter $D_1$, and an optical component system which is arranged for forming an external image (136) of the back-focal plane (132) of the objective optical component (100), which has a diameter (given by the diameter of a circle enclosing all optical paths at the plane of the 10 external image) which is denominated $D_2$ and wherein $D_1$ is larger than a second diameter $D_2$.

19 Claims, 13 Drawing Sheets

(51) Int. Cl.
- *G02B 21/04* (2006.01)
- *G02B 21/18* (2006.01)
- *G02B 21/26* (2006.01)
- *G02B 21/00* (2006.01)
- *G02B 21/36* (2006.01)
- *G02B 23/12* (2006.01)

(52) U.S. Cl.
CPC ............ *G02B 21/04* (2013.01); *G02B 21/18* (2013.01); *G02B 21/26* (2013.01); *G02B 21/361* (2013.01); *G02B 21/367* (2013.01); *G02F 1/353* (2013.01); *G02B 23/12* (2013.01); *G02F 2001/3503* (2013.01)

(56) References Cited

U.S. PATENT DOCUMENTS

| | | | |
|---|---|---|---|
| 5,107,117 | A | 4/1992 | Ennenga et al. |
| 5,450,463 | A * | 9/1995 | Iketaki ............... G21K 7/00 378/43 |
| 6,022,114 | A | 2/2000 | Foo |
| 6,687,051 | B1 | 2/2004 | Wang et al. |
| 9,410,846 | B2 * | 8/2016 | Tidemand-Lichtenberg ............... G01J 3/08 |
| 2010/0245634 | A1 | 9/2010 | Ahdoot |
| 2011/0285838 | A1 | 11/2011 | Kishima et al. |
| 2012/0314283 | A1 | 12/2012 | Jahromi |
| 2015/0362718 | A1 * | 12/2015 | Dam .................. G02B 7/005 250/330 |

FOREIGN PATENT DOCUMENTS

| | | |
|---|---|---|
| GB | 1 325 609 | 8/1973 |
| JP | 55-48721 A | 4/1980 |
| WO | WO 2010/006985 A2 | 1/2010 |
| WO | WO 2011/137907 A1 | 11/2011 |

OTHER PUBLICATIONS

Hu, Qi et al., "High resolution mid-IR spectrometer based on frequency up-conversion" Optical Society of America, 2012.

Kim, Do-Hyun et al., "Upconversion fiber-optic confocal microscopy under near-infrared pumping" Optics Letters, Mar. 1, 2008, pp. 425-427, vol. 33, No. 5.

Kim, D.H. et al., "Review: Upconversion microscopy for biological applications" Microscopy: Science, Technology, Applications and Education, 2010, pp. 571-582.

International Search Report for PCT/DK2014/050021 dated Mar. 31, 2014.

Baldelli, Steven "Infared image upconversion" Nature Photonics, Feb. 2011, pp. 75-76, vol. 5.

Dam, Jeppe Seidelin et al., "High-resolution two-dimensional image upconversion of incoherent light" Optics Letters, Nov. 15, 2010, pp. 3796-3798, vol. 35, No. 22.

Dam, Jeppe Seidelin et al., "Theory for upconversion of incoherent images" Optics Express, Jan. 16, 2012, pp. 1475-1482, vol. 20, No. 2.

Dam, Jeppe Seidelin et al., "Room-temperature mid-infrared single-photon spectral imaging" Nature Photonics, Sep. 16, 2012, pp. 788-793, vol. 6, No. 11.

Kopf, Johannes et al., "Capturing and Viewing Gigapixel Images" ACM Transactions on Graphics, Jul. 29, 2007, vol. 26, No. 3.

Pedersen, Christian et al., "Enhanced 2D-image upconversion using solid-state lasers" Optics Express, Nov. 9, 2009, pp. 20885-20890, vol. 17, No. 23.

International Search Report for PCT/DK2014/050020 dated Mar. 31, 2014.

* cited by examiner

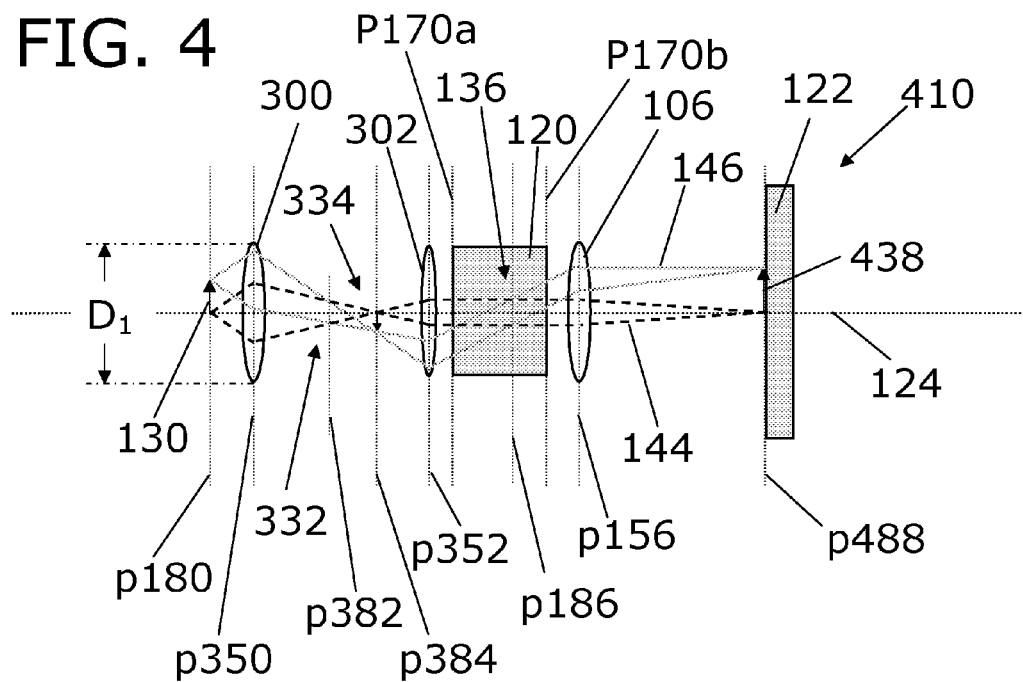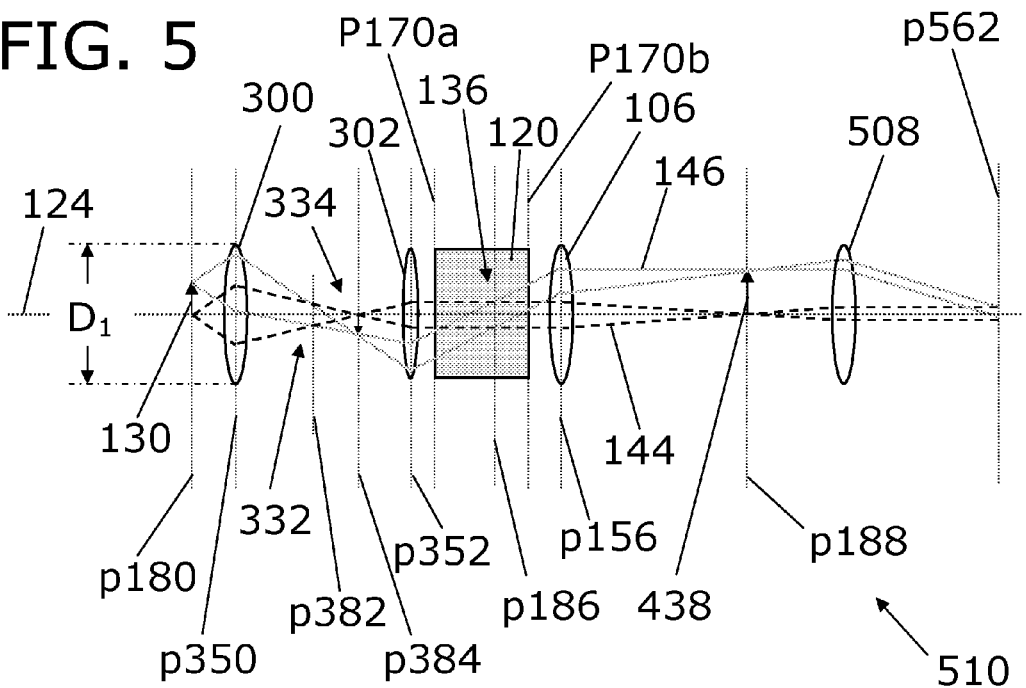

(a) (b)

(a) (b)

$\lambda_y = 2647$ nm $\quad$ $\lambda_y = 2686$ nm $\quad$ $\lambda_y = 2726$ nm

INFRARED UP-CONVERSION MICROSCOPE

CROSS REFERENCE TO RELATED APPLICATIONS

This application is a U.S. National Phase Application of PCT International Application Number PCT/DK2014/050021, filed on Jan. 31, 2014, designating the United States of America and published in the English language, which is an International Application of and claims the benefit of priority to European Patent Application No. 13153491.9, filed on Jan. 31, 2013. The disclosures of the above-referenced applications are hereby expressly incorporated by reference in their entireties.

FIELD OF THE INVENTION

The present invention relates to a microscope and more particularly an up-conversion microscope and a corresponding use thereof and method for obtaining a microscopy image.

BACKGROUND OF THE INVENTION

Imaging of infrared radiation may in general be considered as advantageous, since infrared radiation may carry information which is not obtainable by merely obtaining the images from the visible radiation.

The reference U.S. Pat. No. 6,687,051 describes a microscopic image apparatus for converting infrared light into visible light. The microscopic image apparatus includes a sample stage, an infrared source, an object lens for converting infrared light into visible light, a visible light source, a dichroic mirror, a visible light imaging lens and a visible light image capturing device. The object lens further includes an optical crystal and an infrared object lens. After the infrared source outputs infrared light to a sample placed on the sample stage, the object lens converts infrared light spectrum image into visible light spectrum image. Then, the visible light spectrum image is obtained by the visible light imaging lens and the visible light image capturing device.

In general, it would be advantageous if the requirements to the optical components and light sources could be reduced and/or if the quality of the generated images could be improved.

SUMMARY OF THE INVENTION

Hence, an improved up-conversion microscope would be advantageous, and in particular a more efficient and/or reliable microscope would be advantageous, such as a microscope requiring less power consumption and/or a microscope capable of providing improved up-converted microscopy images.

It is a further object of the present invention to provide an alternative to the prior art.

In particular, it may be seen as an object of the present invention to provide an infrared up-conversion microscope that is advantageous compared to the prior art. In particular, it may be seen as advantageous to provide a microscope which is capable of resolving the problem of prior art which has an objective lens with a large entrance aperture, such as entrance pupil, but suffers from demanding requirements in terms of, e.g., laser power in order to provide up-conversion across a correspondingly large area in the non-linear crystal, or is arranged for only having a small area in the non-linear crystal which needs to be illuminated with a (relatively) low-power laser, but then suffers from the correspondingly small entrance pupil which entails reduced resolution and less illuminated images.

Thus, the above described object and several other objects are intended to be obtained in a first aspect of the invention by providing an up-conversion infrared microscope arranged for imaging an associated object, wherein the up-conversion infrared microscope comprises
  a non-linear crystal arranged for up-conversion of infrared electromagnetic radiation, the non-linear crystal being placed on an optical axis of the microscope,
  an optical component system being placed on the optical axis between
    a plane suitable for comprising the associated object, and
    the non-linear crystal,
  wherein the optical component system comprises
    an objective optical component having an entrance pupil with a first diameter
    a primary optical component subsystem comprising
      a first optical component and/or
      a second optical component,
    which enables forming a first image of a back-focal plane of the objective optical component, wherein the first image is formed in an infinity space on the optical axis of the microscope after the primary optical component subsystem,
  wherein the optical component system is arranged for forming an external image, of the back-focal plane of the objective optical component, wherein the external image, is formed in an infinity space on the optical axis after the optical component system,
  wherein a bundle of optical paths may extend from the associated object, via the entrance pupil through the optical component system, and through the non-linear crystal, and
  wherein the non-linear crystal is placed so that the external image, is situated within the non-linear crystal or in the immediate vicinity of the non-linear crystal, and
  wherein an intersection between the bundle of optical paths and a plane comprising the external image, defines an area with a second diameter $D_2$, and
  wherein the first diameter $D_1$ is larger, such as significantly larger, than the second diameter $D_2$ and wherein the optical component system comprises
    at least one refractive lens, and/or
    at least three curved mirrors.

The invention is particularly, but not exclusively, advantageous for obtaining an up-conversion infrared microscope arranged for imaging an associated object wherein infrared radiation is up-converted to shorter wavelength radiation. Furthermore, it may be seen as an advantage that the optical component system comprises at least one refractive lens, and/or at least three curved mirrors, since this enables realizing that the first diameter $D_1$ is larger, such as significantly larger, than the second diameter $D_2$, and further enables, in a relatively simple manner, that the first diameter $D_1$ is much larger than the second diameter $D_2$, such as 2 times larger, such as 5 times larger, such as 10 times larger, such as 20 times larger, such as 50 times larger, such as 100 times larger, since it enables using either a refractive lens, which can relatively easily be produced to form, e.g., narrow beams of electromagnetic radiation from broader beams of light, or to use more than three curved mirrors, such as reflective surfaces, which enable lessening the requirements to, e.g., the last curved mirror in terms of absolute dimensions and curvature. The present invention may be seen as being based on the novel insight from the present inventors, that it may be beneficial that the first diameter $D_1$ is larger, such as significantly larger, than the second diameter $D_2$, since the large entrance aperture, such as entrance pupil, enables collecting light from a large solid angle and which enables a large numerical aperture, which in turn enables high resolving power, and since the smaller second diameter $D_2$ enables lessening the requirements in terms of the necessary laser power in order to provide up-conversion across an area with diameter $D_2$ in the non-linear crystal. It may be seen as a further insight of the present inventors that arranging the microscope so as to comprise an optical component system which comprises at least one refractive lens, and/or at least three curved mirrors, facilitates in a simple, yet effective, manner that $D_1$ and $D_2$ may too a large extent be chosen almost independently of each other.

It is noted that throughout this application, '$D_1$' may be used interchangeably with 'first diameter' or 'diameter of the entrance pupil of the objective optical component'. It is noted that throughout this application, '$D_2$' may be used interchangeably with 'second diameter' or 'diameter of the area of the intersection between the bundle of optical paths and the plane comprising the external image'.

'Radiation' is generally understood to be electromagnetic radiation' (EMR) which is well-known in the art. EMR is understood to include various types of electromagnetic variation, such as various types corresponding to different wavelength ranges, such as radio waves, microwaves, infrared radiation, EMR in the visible region (which humans perceive or see as 'light'), ultraviolet radiation, X-rays and gamma rays.

EMR is also understood to include radiation from various sources, such as incandescent lamps, LASERs and antennas. It is commonly known in the art, that EMR may be quantized in the form of elementary particles known as photons.

'Visible light' (commonly referred to simply as light) is electromagnetic radiation that is visible to the human eye. Visible light may be understood as having wavelengths in the range of about 380 nanometers, such as 380 nm, to about 740 nm, such as 740 nm. It may also be understood as being a region between the (invisible) infrared, with longer wavelengths and the (invisible) ultraviolet, with shorter wavelengths.

The term 'optical' is to be understood as relating to EMR, such as light.

By up-conversion is understood the conversion of EMR of a first wavelength to a third, smaller wavelength. It may be realized using a light source, such as a laser emitting EMR having second wavelength.

It may in general be understood, that the associated object is not part of the claimed subject matter. It may be understood that the associated object (130) while not being part of the claimed subject matter may be understood as an object useful for defining the scope of the invention, which associated object is being placed on an optical axis (124) of the microscope (110). It may be understood that the associated object may be placed in the plane (p180) suitable for comprising the associated object (130) which plane is coinciding with a front focal plane of the optical component system. It may be understood that the associated object may be placed on the optical axis (124) of the microscope (110) and in the plane (p180) suitable for comprising the associated object (130) which plane is coinciding with a front focal plane of the optical component system. It may be understood that the associated object comprises or is a point source placed on the optical axis (124) of the microscope (110) and in the plane (p180) suitable for comprising the associated object (130) which plane is coinciding with a front focal plane of the optical component system. In more specific embodiments, the associated object is part of the claimed subject matter.

In a specific embodiment, the microscope further comprises a light source arranged for outputting narrow band light to the non-linear optical crystal, wherein, in the optical crystal, the narrow band light and the incoming radiation from the associated object (having infrared absorption spectrum information of the sample) are arranged so as to be coupled, such as the narrow band light being configured for up-converting the incoming radiation in the non-linear crystal. The light source may be a laser source, a light emitting diode (LED) or it may be a laser diode.

'Infrared (IR) radiation' is understood to be electromagnetic radiation with longer wavelengths than those of visible light, such as extending from the nominal red edge of the visible spectrum at 0.74 micrometers (μm) to 300 μm.

It is generally understood, that within the context of the present invention, the infrared radiation is coming in to the microscope from the associated object, and may be interchangeably referred to as "incoming radiation".

The incoming EM radiation may also be referred to as simply the incoming radiation or light (without implying visible radiation). The incoming radiation can be spatially coherent or incoherent. In an embodiment, the method according to the invention is applied to spatially incoherent incoming radiation. This is advantageous as reflected light from objects is typically spatially incoherent in most naturally occurring situations such as outside an optical laboratory.

The incoming EM radiation may be polychromatic or non-monochromatic (equivalent term), meaning that the dissimilar first wavelengths of the incoming EM radiation may be distributed continuously and/or discontinuously in a first wavelength interval. The first wavelength interval is thereby defined as the wavelength range or interval between the largest and smallest of the first wavelengths. Correspondingly, the up-converted EMR and the produced dissimilar up-converted wavelengths, are distributed continuously and/or discontinuously in an up-converted wavelength interval.

The incoming radiation may comprise a plurality of spatial frequencies so that it contains image information such as information related to a sample, an associated scene, an associated object, a view, a picture, graphics, text, patterning etc., which is different from a beam profile typical for a collimated beam of light such as a laser beam. The incoming EMR may form a one- or two-dimensional image with an image plane having a spatial extension orthogonal to the optical axis. Therefore, in some embodiments, the method and the microscope may serve to up-convert a one- or two-dimensional image represented in the incoming radiation.

The image may be formed by EMR from any one, two or three-dimensional object which may be illuminated by a radiation source or be a radiation source itself. In addition, the incoming radiation may comprise any one of coherent radiation, incoherent radiation and a combination of coherent and incoherent radiation.

In order to have a uniform up-conversion process, the converged or focused incoming EMR may form a plane or approximately plane wave inside the non-linear crystal. This may be achieved by placing the non-linear crystal in an infinity space. The optical component system may provide the advantage of focusing the incoming EMR to a plane or approximately plane wave inside the non-linear crystal, thereby ensuring a uniform up-conversion process which serves to conserve the spatial intensity distribution over the image of the incoming EMR.

In the case of spatially incoherent incoming radiation, it may not be possible to converge all radiation inside the non-linear crystal, and the laser mode may form an aperture (inside the non-linear crystal) that is large enough to support high resolution imaging.

The microscope may be configured for up-converting the incoming radiation in the non-linear crystal using, e.g., three- or four-wave mixing or any frequency mixing process, including Second Harmonic Generation (SHG), Third Harmonic Generation (THG), Sum Frequency Generation (SFG), Difference Frequency Generation (DFG) and Optical Parametric Oscillator (OPO). The microscope may in particular embodiments be configured such that the interaction between the incoming radiation and the narrow band light, such as a laser beam, inside the non-linear crystal comprises sum frequency generation, SFG. SFG constitute the underlying physical mechanism that allows for up-converting of incoming radiation as described herein. That is, the shortest wavelength of the up-converted wavelength interval may be shorter than the shortest wavelength of the first wavelength interval (of the incoming EMR). For example, the first wavelength interval may be an infrared wavelength interval and the up-converted wavelength interval may be a visible wavelength interval, or the first wavelength interval may be a mid-infrared wavelength interval and the up-converted wavelength interval may be a near infrared wavelength interval. A possible advantage of DFG or OPO is that the narrow band light, such as the laser photons, are converted which can lead to an amplification of the signal, i.e., the incoming photons from the associated object. The material of the non-linear crystal may be selected to optimize the up-conversion process, such as the SFG, between incoming radiation in the first wavelength interval and the narrow band light, such as a laser light having a laser wavelength, so as to produce up-converted EMR having a third wavelength.

The non-linear crystal may be phase matched to optimize the conversion of incoming radiation in the first wavelength interval to the radiation in the up-converted or third wavelength interval. In order to obtain a good interaction between the incoming radiation and the narrow band light, such as a laser beam, to the up-converted radiation, phase matching (PM) or quasi phase matching (QPM) is required. The nonlinear crystal may be configured to be tuned for obtaining phase matching. This can be accomplished using angle tuning of the nonlinear crystal, by applying temperature or pressure to crystal or through quasi phase matching.

The nonlinear crystal may be configured to be poled for obtaining phase matching. This method is referred to as quasi phase matching. By (synthetically) changing the direction of the polarization of the dipole moment of the nonlinear crystal periodically, quasi phase matching can be obtained. The periodicity is specific to the interaction at hand. Two nonlinear crystals often used for quasi phase matching are KTP and $LiNbO_3$. The nonlinear crystal may be configured to be poled in a fanned manner. The fanning implies that the periodicity of the poled crystal is different at different transverse positions in the crystal. Thus by translating the nonlinear crystal transversely with respect to the incoming radiation, different wavelength components of the incoming radiation can be quasi phase matched, thus efficiently processed. The nonlinear crystal may be a Brewster cut. This is advantageous since it solves a practical problem that arises from the fact that three different wavelengths are involved, i.e. the wavelength of the incoming radiation, the wavelength of the narrow band light, such as a laser beam, and the wavelength of the up-converted radiation. It is difficult and expensive to manufacture dielectric coatings that can act as an antireflection coating at all three wavelengths. However if the nonlinear crystal is Brewster cut, p-polarized will essentially be transmitted loss-less (or with very low loss), thereby elevating the need for coatings at the end surfaces. When using quasi phase matching all the three mentioned radiation fields can be p-polarized. Thus periodically poled crystals with Brewster cut ends are particularly advantageous.

The light source, such as a laser, may be provided by many different types of light sources, such as lasers or laser systems, including lasers involving a laser pumped by another laser, laser arrays, resonators and more, some of which will be described elsewhere. Optical components such as optical components and mirrors for directing the narrow band light, such as a laser beam to, and optionally focusing it in, the non-linear crystal may be provided in association with the light source, such as the laser.

Lasers are generally available within a large range of wavelengths. The second Wavelength of the laser beam is selected depending on the wavelength of the incoming radiation and the desired wavelength of the up-converted radiation. The laser may provide a second wavelength in the near infrared (NIR) or visible spectrum. This is advantageous as most commercial applications involves converting longer wavelengths to shorter wavelengths/higher frequencies in or near the near infrared (NIR) and visible spectra.

The narrow band light, such as the laser beam, may have a high power inside the nonlinear crystal. This is advantageous as the efficiency of the up-conversion process, such as SFG, and thereby the power of the up-converted radiation increases with increasing power of the incoming radiation and the narrow band light, such as the laser. However, most often the incoming radiation is determined by the nature of the application and difficult to amplify. The power of the narrow band light, such as the laser beam, inside the non-linear crystal may be at least 10 W, such as at least 25 W, 50 W, 75 W, such as at least 100 W. The maximum power is limited by the damage intensity threshold and size of the nonlinear crystal. Different kinds of lasers are capable of delivering such high powers include diode lasers, $CO_2$ lasers, solid state lasers, fiber lasers, disc lasers, etc.

The narrow band light, such as the laser beam, may be collimated or at least substantially collimated inside the non-linear crystal. How this may be achieved depends on the relation between the focusing of the beam and the non-linear crystal. In case of long crystals, it may be achieved by a beam which is not very tightly focused, so that the Raleigh length is long relative to the length of the beam inside the crystal. On the other extreme with a short crystal, the beam may be tightly focused as only the focus point itself (where the wavefront is always planar) is inside the crystal.

For the purpose of providing the high power of the narrow band light, such as the laser beam, inside the nonlinear crystal, the arrangement may comprise an optical cavity for providing an increased intra-cavity power of the narrow band light, such as the laser beam. In this embodiment, the nonlinear crystal is arranged inside the optical cavity. The optical cavity may comprise two or more mirrors aligned so as to form a standing wave cavity.

In a further embodiment, the laser may comprise a laser medium arranged inside the optical cavity and an extra-cavity pump source for pumping said laser medium. For example, the laser medium may be a laser crystal, a semiconductor, a gas or a liquid, and the pumping source may be an extra-cavity laser such as a semiconductor laser, diode laser, or solid state laser, or a flash lamp, a light emitting diode or current. The optical cavity may be a unidirectional ring cavity. In this embodiment, the optical cavity may comprise a frequency selective element for narrowing the bandwidth of the intra cavity laser beam. This approach also has the purpose of reducing the formation of secondary lasing modes in a standing wave cavity. Typical frequency selective elements are etalons, Lyot filters, gratings and birefringent prisms.

In a further embodiment involving a setup with an intra-cavity laser crystal pumped by an extra-cavity laser as described above, the optical cavity is formed between end facets of the intra-cavity laser crystal and the non-linear crystal, respectively. This has the advantage of allowing for a very compact arrangement which is of interest in many commercial applications. In this embodiment, the various surfaces may be coated to be reflective/transmissive for relevant wavelengths as will be described later.

The arrangement and method described above is capable of enabling imaging, e.g. by utilizing a detector that is sensitive to the up-converted EM radiation in the second wavelength interval.

The 'non-linear crystal' is understood to be crystal which possesses a nonlinear dielectric response function to optical radiation, which in turn enables up-conversion to take place within the crystal. The non-linear crystal can for example be a Brewster's cut non-linear crystal, e.g. a periodically poled (PP) $KTiOPO_4$, $LiNbO_3$, or $PP-LiOTiO_3$ crystal. These are described in more detail in WO 2010/006985 which is hereby incorporated by reference in entirety. The non-linear crystal can further be temperature controlled using a Peltier element or an oven.

Also, the number of different type of lasers available on the marked is ever-growing. If no optical cavity is used, the laser can be a high power laser, such as diode lasers, CO2 lasers, solid state lasers, fiber lasers, disc lasers etc. High power lasers are expected to increase in efficiency and fall in price over the coming years. Also, new high power laser types may be developed.

The laser may be a continuous wave (CW) laser or a pulsed laser. If a pulsed laser is used, the up-converted radiation will be produced in pulses as well, and this may be applicable in many applications. Pulsed lasers can generally be used to provide higher power as the energy is delivered in short bursts (and power is energy/time). Several different applicable high power lasers are described in more detail in WO2010/006985 which is hereby incorporated by reference in entirety.

By 'infrared up-conversion' is understood conversion of infrared EMR to EMR with shorter wavelengths, such as wavelengths in the visible region.

By 'microscope' may be understood an instrument used to see objects that are too small for the naked, human eye. In specific embodiments, the microscope may enable resolving features which are smaller than 100 micrometers, such as smaller than 10 micrometers, such as smaller than 5.5 micrometers, such as smaller than 2.8 micrometers, such as smaller than 1 micrometer, such as smaller than 0.1 micrometer. In specific embodiments, the microscope may enable resolving features which are smaller than or equal to 100 times the wavelength of the infrared electromagnetic radiation emitted from the associated object, such as smaller than or equal to 10 times the wavelength of the infrared electromagnetic radiation emitted from the associated object, such as smaller than or equal to 5 times the wavelength of the infrared electromagnetic radiation emitted from the associated object, such as smaller than or equal to 3 times the wavelength of the infrared electromagnetic radiation emitted from the associated object, such as smaller than or equal to $5.5/2.7=2.04$ times the wavelength of the infrared electromagnetic radiation emitted from the associated object, such as smaller than or equal to 2 times the wavelength of the infrared electromagnetic radiation emitted from the associated object, such as smaller than or equal to $2.8/2.7=1.04$ times the wavelength of the infrared electromagnetic radiation emitted from the associated object, such as smaller than or equal to the wavelength of the infrared electromagnetic radiation emitted from the associated object. Advantages of being able to resolve smaller structures may be that that information which is not otherwise attainable can be achieved. In specific embodiments, it is a further advantage that spectrally resolved data may be achieved for spatially resolved data.

By 'imaging an associated object' is understood the process of providing an image, or data corresponding to an image, of an associated object. It is understood that the associated object is not to be construed as a limiting feature for the purpose of construing the appended claims. It is also understood that 'object' and 'associated object' may be referred to interchangeably. In particular embodiments, it is understood that 'imaging' comprises receiving at the same time light from multiple, spatially separated locations in the object, such as all parts of the associated object, so that multiple optical paths may be travelled by photons at the same time and may then be detected by the microscope's photo-detector or an eye of a human observer.

The 'optical axis' of the microscope is generally understood in the art to refer to an imaginary line along which there is some degree of rotational symmetry in an optical system, such as a microscope.

The 'optical component system' is understood to comprise one or more optical components, such as one or more refractive lenses and/or one or more curved mirrors, such as reflective lenses, wherein the optical component system is arranged for forming an external image of the back-focal plane of the objective optical component. It is noted that the external image of the back-focal plane of the objective optical component may be a real image of the back-focal plane of the objective optical component. It may also be understood that the external image of the back-focal plane of the objective optical component may be in a plane which corresponds to a Fourier plane with respect to the associated object, such as with respect to the associated object when the associated object is being placed in a front focal plane of the optical component system. An advantage of reflective optical components may be that they may suffer less from chromatic aberration compared to refractive optical elements. Another advantage of reflective optical components may be that they may be arranged to reflect light back and forth and may for this reason help in reducing the length, such as the length of the projection of the optical path onto the optical axis. Another advantage of reflective optical components may be that they are relatively lighter than refractive optical components. An advantage of refractive optical elements may be that they have a clear aperture, which may result in better contrast. This may be opposed to, e.g., reflective objectives which may comprise a secondary mirror resulting in central obstruction. Another advantage of refractive optical elements may be that they require only low maintenance and generally does not require collimation or recoating to the same extent as reflective optical components. In a particular embodiment the microscope comprises exclusively refractive optical components. In a particular embodiment the microscope comprises exclusively reflective optical components.

It may be understood when reference is made to 'front focal plane' and 'back focal plane' (also known as 'rear focal plane') that these planes are defined as the planes, perpendicular to the optical axis, which pass through the front and rear focal points of a general optical component system, such as a single optical component or an optical component system (where the general optical component may, for example, be the 'objective optical component' or 'the optical component system'). An object infinitely far from the general optical system in front of the optical system forms an image at the back focal plane. For objects a finite distance away, the image is formed at a different location, but rays that leave the object parallel to one another cross at the back focal plane.

By 'optical component' is in general understood any one of one or more refractive lenses and/or one or more curved mirrors, such as reflective lenses. In a specific embodiment, the optical components are given by one or more lenses. In a specific embodiment, one or more optical components are refractive optical components. In a specific embodiment, one or more optical components are reflective optical components.

The 'external image' is formed in an infinity space on the optical axis after the optical component system. The word external merely refers to the position of the 'external image' outside of the optical component system. It is noted, however, that there may be optical components placed after the external image also, such as a tube lens and an eyepiece.

It is noted that when referring to 'before' and 'after' on the optical axis, reference is made to an understood direction from the optical object, which is to be understood to be corresponding to the associated object, and through the microscope.

By 'a plane suitable for comprising the associated object' is understood a plane wherein an object can be placed so as to allow the microscope to obtain a microscopy image thereof.

By 'objective optical component' is understood an optical component that gathers EMR from the associated object, and retransmits the EMR further along the optical axis. The objective optical component can be a single refractive lens or mirror, such as reflective lens, or combinations of several optical elements. The objective optical component may in embodiments focus the EMR or may transmit or reflect the EMR into an infinity space.

The objective optical component has an 'an entrance pupil with a first diameter $D_1$' which is understood to define the diameter from which EMR from the object can be gathered, such as the diameter for an area on the objective optical component from which EMR from the object can be gathered and transmitted towards the non-linear crystal. For a filled cylindrical entrance pupil, this corresponds to a solid angle for the point in the plane suitable for comprising the associated object on the optical axis. In a particular embodiment, the diameter of the entrance pupil is given by the diameter of the objective optical component. In one embodiment, the objective optical component is a refractive lens, which is arranged for collecting light from the associated object across its diameter, and all the collected light is transmitted towards the non-linear crystal, in which case the diameter of this refractive lens corresponds to the diameter of the entrance pupil.

The 'a primary optical component subsystem' and 'the secondary optical component subsystem' are systems which enables forming, respectively, a first and second image of a back-focal plane of the objective optical component, formed, respectively, in an infinity space on the optical axis of the microscope after the primary or secondary optical component subsystem. Each of the first and second images of the back-focal plane of the objective optical component may be coincident with the external image but is not necessarily coincident with the external image. In other words, the first image of the back-focal plane of the objective optical component may be coincident with the external image or the second image of the back-focal plane of the objective optical component may be coincident with the external image. In some embodiments it may also be possible to have further optical components in the optical component system, such as a fifth and sixth optical component in a tertiary optical component subsystem which forms a third image of the back-focal plane of the first optical component where this third image is coincident with the external image. The primary and secondary optical component subsystem is each understood to comprise one or more optical components, such as one or more refractive lenses and/or one or more curved mirrors, such as reflective lenses.

'A bundle of optical paths' is understood to refer to the possible optical paths from the object and through the microscope, such as the optical paths which may be relevant for image formation.

It may be understood that the bundle of optical paths may extend from the associated object (130) when the associated object is being placed
   on the optical axis (124) of the microscope (110), and
   in the plane (p180) suitable for comprising the associated object (130) which plane is coinciding with a front focal plane of the optical component system.

In an embodiment, the up-conversion infrared microscope (110) is further comprising the associated object (130).

It is understood that 'the non-linear crystal is placed so that the external image, is situated within the non-linear crystal or in the immediate vicinity of the non-linear crystal', such as the external image being placed within a distance from the non-linear crystal, which distance is short enough to have light rays from the edge of the depicted field of view being up-converted. Having the back focal plane placed too far from the non-linear crystal will result in the edges of the image to be converted only at low efficiency and with a less specific bandwidth or even not converted at all. Thus the obtainable image size after up-conversion would be limited with less optimal optical arrangements. Furthermore, the spectral resolution of the up-converted light would decrease for the edge of the image. Ideally the image of the back-focal plane is placed near the middle of the non-linear crystal.

It is understood that 'the intersection between the bundle of optical paths and a plane comprising the external image', defines an area with a second diameter $D_2$, and wherein the first diameter $D_1$ is larger, such as significantly larger, than the second diameter $D_2$. It is also understood, that 'diameter' is not to be construed as neither exclusively referring nor limiting to circular areas. It is understood that also non-circular areas, including areas which are non-filled round areas (such as rim like areas, with one or more enclosed holes), are encompassed by the present invention, and the first diameter $D_1$ and the second diameter $D_2$ may in those cases be understood to be given by, respectively, $D_1 = \mathrm{squareroot}(4*A_1/\mathrm{pi})$, and $D_2 = \mathrm{squareroot}(4*A_2/\mathrm{pi})$, where $A_1$ is the area of the entrance pupil of the objective optical component, i.e., the area on the objective optical component which is arranged for collecting EMR from the associated object, and where $A_2$ is the area of the intersection in the plane of the external image orthogonal to the optical axis.

Pi is the mathematical constant "π" corresponding to the ratio of a circle's circumference to its diameter, which numerically corresponds to approximately 3.1415927.

A possible advantage of the present invention is that even for a relatively small laser spot on the non-linear crystal—which effectively forms an aperture for the up-conversion process of the in-coming EMR—the incoming EMR may be collected from a relatively large solid angle, since the first diameter $D_1$ of the objective optical component, such as an objective lens, which is responsible for collecting EMR from the associated object, is larger, such as significantly larger, than the second diameter $D_2$ which corresponds to a diameter of the bundle of optical paths from the object at the point of the external image. In other words, the relatively large $D_1$, such as objective optical component, allows collecting photons from a large solid angle, while the small diameter of the corresponding optical bundle at the external image allows up-conversion with a spatially relatively small laser spot. The collection of photons from a large solid angle may be seen as advantageous since it entails—all other things equal—a larger numerical aperture (NA) which in turn enables a better spatial resolution. It is understood, that it may not be the large solid angle as such, which enables picking up more photons, in case photons cannot be picked up from within the angle, for example if blocking objects are placed between the associated object and the objective optical component. The need for only a relatively small narrow band light, such a laser, spot may be seen as advantageous since it lessens the requirements to the power of the light source, such as the laser, which in turn enables use of cheaper lasers and use of less energy which is cheaper and better for the environment, and results in less thermal issues.

The invention may further be advantageous for providing the image information of the microscopy image in up-converted EMR, which may relatively easily be detected using photo-detectors for, e.g., visible EMR, which are relatively simple to operate (such as can easily be kept in darkness and need no cooling), or simply be detected directly by the human eye. As opposed hereto, detectors for infrared radiation typically needs cooling and are difficult to keep in (infrared) darkness. Furthermore, infrared radiation cannot be observed by the human eye.

The present invention may be used to up-convert polychromatic EMR containing image information which is different from a beam profile of a laser beam applied in the up-conversion process. Thus, it may be preferred that the incoming EMR is not a laser beam.

In another embodiment an up-conversion infrared microscope is provided, wherein the first diameter $D_1$ is at least 2, 3, 4, 5, 6, 7, 8, 9, 10, 20, 50, 100, 200, 500, or 1000 times larger than the second diameter $D_2$. In a specific embodiment, the first diameter $D_1$ is 50 times larger than the second diameter $D_2$. An advantage of having the first diameter $D_1$ being, e.g., at least 2 times larger than the second diameter $D_2$ may be that allows collecting more light from the object for the same diameter of the optical bundle at the external image. Furthermore it may allow using a larger size objective and longer working distance to the object. It is understood, that for the up-conversion to function efficiently in the non-linear crystal and/or in order to enable providing high quality microscopy images, $D_2$ cannot be much larger than the diameter of an associated laser spot in the crystal. However, creating a large laser spot requires a lot of energy, and it may thus be seen as advantageous to keep $D_2$ small on an absolute scale.

In another embodiment an up-conversion infrared microscope is provided, wherein the second diameter $D_2$ is less than 5 mm, such as less than 4 mm, such as less than 3 mm, such as less than 2.5 mm, such as less than 2 mm, such as less than 1.5 mm, such as less than 1 mm, such as less than 0.75 mm, such as less than 0.5 mm, such as less than 0.25 mm, such as less than 0.1 mm. An advantage of having a small second diameter may be, that it enables obtaining a relatively high intensity of, e.g., a LASER in the area defined by the intersection between the bundle of optical paths from the associated object and the plane comprising the external image. This high intensity may be realized, since the intensity is understood to be power per unit area, and decreasing the small second diameter, which needs to be illuminated to have all optical rays from the associated object up-converted, thus enables increasing the intensity for an equal power. In effect, a possible advantage is that less power of, e.g., an associated LASER is required. In a specific embodiment, $D_2$ is within 0.5-1 mm.

In another embodiment an up-conversion infrared microscope is provided, wherein the first diameter $D_1$ is at least 2 mm, such as at least 2.5 mm, such as at least 3 mm, such as at least 5 mm, such as at least 7.5 mm, such as at least 10 mm, such as at least 12.5 mm, such as at least 15 mm, such as at least 17.5 mm, such as at least 20 mm, such as at least 25 mm, such as at least 30 mm, such as at least 40 mm, such as at least 50 mm, such as at least 100 mm, such as at least 1000 mm. An advantage of having a large first diameter may be, that it enables collecting a relatively large amount of photons from the associated object, since the large diameter corresponds to a large solid angle, if the distance is kept similar. Alternatively, an advantage may be that the working distance may be increased although a similar solid angle may be covered. In a particular embodiment, $D_1$ is less than 50 mm, such as within 3-50 mm, such as within 3-25 mm.

In another embodiment an up-conversion infrared microscope is provided, wherein the microscope comprises
- an x-y-stage being motorized, where an x-y-plane is understood to be parallel to the plane (p180) suitable for comprising the associated object (130),
- a photo-detector (122) arranged to be able to record an up-converted microscopy image (138, 242) of the associated object (130),
- a controller arranged for controlling the x-y-stage and the photo-detector, so as to obtain a plurality of up-converted scanning images of the associated object, each of which scanning images corresponds to a separate position in the x-y-plane of the associated object with respect to the optical axis of the microscope.

In another embodiment an up-conversion infrared microscope is provided, wherein the working distance of the microscope is at least as large as the second diameter $D_2$, such as larger than the second diameter $D_2$, such as at least 1.5 times larger than the second diameter $D_2$, such as at least 2 times larger than the second diameter $D_2$, such as at least 2.5 times larger than the second diameter $D_2$, such as at least 5 times larger than the second diameter $D_2$, such as at least 10 times larger than the second diameter $D_2$, such as at least 25 times larger than the second diameter $D_2$, such as at least 50 times larger than the second diameter $D_2$, such as at least 100 times larger than the second diameter $D_2$, such as at least 200 times larger than the second diameter $D_2$, such as at least 500 times larger than the second diameter $D_2$. The 'working distance' may be understood to be the distance from the front of the objective optical component, such as the portion of the objective optical element being closest to the associated object, to the associated object when the associated object is in sharp focus. An advantage of having the working distance of the microscope being at least as large as the second diameter $D_2$ may be that it enables realizing the advantages of having a small $D_2$, as outlined above, while still keeping a large working distance which, e.g., may allow more conveniently placing samples in the microscope. In specific embodiments, the working distance is at least 2 mm, such as at least 3 mm, such as at least 5 mm, such as at least 7.5 mm, such as at least 10 mm, such as at least 12.5 mm, such as at least 15 mm, such as at least 17.5 mm, such as at least 20 mm, such as at least 25 mm, such as at least 30 mm, such as at least 40 mm, such as at least 50 mm, such as at least 100 mm, such as at least 1000 mm.

In another embodiment an up-conversion infrared microscope is provided, wherein the numerical aperture is at least 0.2, such as at least 0.3, such as at least 0.4, such as at least 0.5, such as at least 0.6, such as at least 0.7, such as at least 0.8, such as at least 0.8, such as at least 0.9. An advantage of having a large numerical aperture may be that the resolving power is increased, i.e., that spatially smaller features in the associated object may be resolved.

In another embodiment an up-conversion infrared microscope is provided, wherein the optical component system further comprises
 a secondary optical component subsystem comprising
  a third optical component and/or
  a fourth optical component,
 which enables forming a second image of a back-focal plane of the objective optical component, wherein the second image is formed in an infinity space on the optical axis of the microscope after the secondary optical component subsystem.

An advantage of the secondary optical component subsystem may be, that it provides more freedom in designing the microscope, such as enables having the external image at a larger distance from the optical components, such as refractive lenses and/or mirrors, such as reflective lenses. It may be understood, that it is a basic insight of the present inventors, that for a system without the secondary optical component subsystem, such as a system comprising only the primary optical component subsystem, it may be seen as a problem that the ratio between a first diameter $D_1$ and a second diameter $D_2$, may be directly related to a first distance from
 the end of the primary optical component subsystem (which in this case is also the end of the optical component system)
to
 the first image of the back focal plane of the objective optical component (which in this case is the external image).

The reason for this, is that the ratio between a first diameter $D_1$ and a second diameter $D_2$, may be directly related to a ratio of the focal lengths of the first and second optical components, which in turn may be directly related to the first distance. While it may be advantageous to have a large ratio between the first diameter $D_1$ and a second diameter $D_2$, it may be disadvantageous to have a correspondingly small distance between the end of the optical component system and the external image, because this leaves little room for the non-linear crystal. However, the present inventors have also realized, that this fixed relationship may be overcome, thereby dispensing with the need to choose between a good (large) ratio between $D_1$ and $D_2$ and a good (large) distance between the end of the optical component subsystem and the external image, since it may be overcome by introducing the secondary optical component subsystem. For example, for a given ratio between a first diameter $D_1$ and a second diameter $D_2$, a first distance from the end of the primary optical component subsystem to the first image of the back focal plane of the objective optical component may be smaller than a second distance from
 the end of the secondary optical component subsystem (which in this case is also the end of the optical component system
to
 the second image of the back focal plane of the objective optical component (which in this case is the external image),
which in turn provides more space, e.g., for placement of the non-linear crystal, after an embodiment with an optical component system comprising both a primary and a secondary optical component subsystem, compared to embodiments without a secondary optical component subsystem.

In another embodiment an up-conversion infrared microscope is provided, wherein a first distance from the end of the primary optical component subsystem to the first image of the back focal plane of the objective optical component is smaller than a second distance from the end of the secondary optical component subsystem to the second image of the back focal plane of the objective optical component. An advantage of this may be that more space may be provided around the second image of the back focal plane of the objective optical component compared to the amount of space around the first image of the back focal plane of the objective optical component. This in turn may allow use of a larger non-linear crystal, or may allow placing the non-linear crystal more optimally with respect to the second image of the back focal plane of the objective optical component, which may be the external image. For example, the relatively small first distance may be extremely small which renders it difficult to place the non-linear crystal in an optimal position (if the first image is the external image), while the relatively larger second distance may allow more optimal placement of the non-linear crystal (where the second image is the external image).

For example, the objective optical component may be a lens with diameter and entrance pupil being 25 mm. The light source may be a laser and the laser spot at the non-linear crystal may have a diameter of 0.5 mm. In order to scale the back focal plane of the objective lens, the first and second optical components may be two lenses with, respectively, focal lengths 75 mm and 1.8 mm, being arranged in a 4f-setup. In this way, the back focal plane of the objective lens may be imaged in a phase-conserving manner while being scaled with a factor 1.8/75=50, i.e., from 25 mm to 0.5 mm. However, with this arrangement, the non-linear crystal needs to be placed extremely close to the second lens, such as approximately a focal length of the second lens from the second lens, in order to keep the external image at a proper position with respect to the non-linear crystal. This may not be the optimal situation. However, by adding two additional lenses—the secondary optical subsystem in this example—such as two lenses with equal focal length which forms yet another phase-conserving image of the back focal plane of the objective lens, the external image may be placed more conveniently with respect to the optical components of the microscope, thus enabling placing the external image more optimally with respect to the non-linear crystal.

In another embodiment an up-conversion infrared microscope is provided, wherein the primary optical component subsystem comprises the first optical component and the second optical component, such as a first refractive lens or mirror, such as reflective lens and a second refractive lens or mirror, such as reflective lens, wherein the first and second optical components may be spatially separated components.

In another embodiment an up-conversion infrared microscope is provided, wherein the primary optical component subsystem is arranged as a 4f-system, such as a 4f-system wherein the first focal length f1 of the first optical component is larger than the second focal length f2 of the second optical component. An advantage of having the primary optical component subsystem being arranged as a 4f-system may be that the optical components can be kept relatively simple.

In another embodiment an up-conversion infrared microscope is provided, wherein the secondary optical component subsystem comprises the third optical component and the fourth optical component, such as a first refractive lens or mirror, such as reflective lens, and a second refractive lens or mirror, such as reflective lens, wherein the first and second optical components may be spatially separated components. In another embodiment an up-conversion infrared microscope is provided, wherein the secondary optical component subsystem is arranged as a 4f-system, such as a 4f-system wherein the third focal length f3 of the third optical component is equal, such as substantially equal to, the fourth focal length f4 of the fourth optical component. An advantage of having the secondary optical component subsystem being arranged as a 4f-system may be that the optical components can be kept relatively simple.

'4f-systems' are generally known in the art. The inventors have realized that it is a simple and efficient system for reliably scaling the width of an optical bundle from a first infinity space (with a first diameter of the optical bundle) to a second infinity space (with a second diameter of the optical bundle). As such, 4f systems may be useful for, e.g., preparing a phase-conserving image (in the second infinity space) of the back focal plane of the objective optical component (in the first infinity space), where the phase-conserving image may be scaled in diameter. However, 4f-systems may also be applicable without scaling, such as for re-imaging a certain image, such as an image of a back-focal plane, such as imaging a back-focal plane in a first infinity space in a second infinity space, even without scaling.

In another embodiment an up-conversion infrared microscope is provided, wherein a primary infinity space is situated along the optical axis between the objective optical component and the primary optical component subsystem, and wherein the first image is a phase-conserving image of the back focal plane of the objective optical component. An advantage of having an infinity space may be that it enables simply adding optical elements, such as filters, etc., without the effects of spherical aberrations or modification of the working distances of any focusing optics.

In another embodiment an up-conversion infrared microscope is provided, wherein the microscope further comprises an eyepiece enabling an associated human observer to visually observe the microscopy image of the associated object through the eyepiece. An advantage of having an eyepiece may be that the microscopy image may be observed directly with the human eye without the need for photo-detectors. Eyepiece is understood as being synonymous with ocular.

In another embodiment an up-conversion infrared microscope is provided wherein the microscope further comprises a photo-detector, such as a charge-coupled device CCD, which is capable of detecting the microscopy image of the associated object and converting the microscopy image to corresponding spatially resolved image data. An advantage of having a photo-detector may be that the microscopy image may be converted into image data, which may subsequently be stored, processed, analysed and/or shown on a display device, such as a computer monitor.

In another embodiment an up-conversion infrared microscope is provided, wherein the up-conversion infrared microscope is arranged so as to enable imaging of the associated object, wherein the associated object is closer to the objective optical component than a first image of the associated object within the microscope. In another embodiment, the microscope is arranged so that the distance between the plane suitable for comprising the associated object and the objective optical component is smaller than the diameter of the entrance pupil. In another embodiment, the microscope is arranged so that the distance between the plane suitable for comprising the associated object and the objective optical component is smaller than 1 meter, such as smaller than 0.5 m, such as smaller than 0.3 m, such as smaller than 0.2 m, such as smaller than 0.1 m, such as smaller than 0.05 m, such as smaller than 0.03 m, such as smaller than 0.02 m such as smaller than 0.01 m, such as smaller than 1 mm, such as smaller than 0.1 mm. An advantage of having such relatively small distance could be, that a large numerical aperture could be achieved for a relatively small objective optical component.

In another embodiment an up-conversion infrared microscope is provided which further comprises a light source, such as a laser, arranged for emitting a beam of narrow band light, such as a laser beam, onto the non-linear crystal, which beam of narrow band light, such as the laser beam, may supply energy for the up-conversion.

In another embodiment an up-conversion infrared microscope is provided which further comprises a light source, such as a laser, arranged for emitting a beam of narrow band light, such as a laser beam, onto the non-linear crystal, which beam of narrow band light, such as the laser beam, is arranged for having a diameter of $w_0$ at the non-linear crystal, wherein the external image, is situated inside the non-linear crystal or within a distance $D_{ei\text{-}nlc}$ from the non-linear crystal, such as from any part of the non-linear crystal, given by $$D_{ei\text{-}nlc} = n(D_2/D_1)(D_2+w_0)F/(R), \text{ where}$$

F is a focal length of the objective optical component,
R is a radius of an area of the associated sample which the microscope is arranged for imaging,
$w_0$ is the diameter of the laser beam, such as the diameter of the laser beam at the non-linear crystal, such as the diameter of the laser beam at the non-linear crystal at the end of the non-linear crystal being closest to the external image if the external image is not within the non-linear crystal,
n is a refractive index of a medium in the microscope.

It may be understood, that if beyond this distance, there is little or no overlap between the laser beam and the bundle of rays from the associated object with diameter $D_2$. In other words, the expression for $D_{ei\text{-}nlc}$ is given by calculating the angle $\theta_2$ at the position of the external image between light rays from the center of the field of view and at the edge of the field of view, and further calculating the distance from the external image where this angle has caused the respective light rays to be further apart than $(D_2+w_0)$, so that there is no overlap between the laser and the light rays from the edge of the field of view. For small angles, this distance may be given by:

$$D_{ei\text{-}nlc} = n(D_2 + w_0)/\theta_2,$$
$$= n(D_2/D_1)(D_2 + w_0)F/(R)$$

In a specific, exemplary embodiment, this may correspond to a distance of $$D_{ei\text{-}nlc} = n(D_e/D_1)(D_2+w_0)F/(R) = 4.4 \text{ mm},$$

based on a radius of the imaged area in the microscope R=150 µm, a focal length of the objective lens F=25 mm, an entrance pupil of the objective lens $D_1$=25 mm, $D_2$=D1*1.8/75=0.60 mm, a diameter of the laser beam $w_0$=0.50 mm, n is the refractive index of the medium which in air is 1. In more specific embodiments, the external image, is situated inside the non-linear crystal or within a distance of 0.75× $D_{ei\text{-}nlc}$, such as within a distance of 0.5× $D_{ei\text{-}nlc}$, such as within a distance of 0.25× $D_{ei\text{-}nlc}$ from the non-linear crystal.

In another embodiment an up-conversion infrared microscope is provided, which further comprises further comprising a tube optical component, such as a tube lens, which enables forming a microscopy image of the associated object. In another embodiment an up-conversion infrared microscope is provided, wherein the photo-detector is arranged for detecting electromagnetic radiation having wavelengths within the visible regime. In another embodiment an up-conversion infrared microscope is provided, wherein the up-conversion infrared microscope is arranged for up-converting infrared electromagnetic radiation from an infrared region to a region comprising a part of a near-infrared region and/or a part of a visible region. In another embodiment an up-conversion infrared microscope is provided, wherein one or more of the optical components, such as every one of the optical components, may be a refractive lens. In another embodiment an up-conversion infrared microscope is provided, wherein one or more of the optical components, such as every one of the optical components, may be a curved mirror, such as a reflective lens.

According to a second aspect, the invention further relates to use of a microscope according to the first aspect for providing up-converted EMR so as to form a microscopy image based on the up-converted EMR and/or for obtaining spectral information from the associated object.

According to a third aspect, the invention further relates to a method for providing forming a microscopy image of an associated object, wherein the microscopy image is based on infrared electromagnetic radiation emitted from the object, the method comprising Redirecting electromagnetic radiation from the associated object using an optical component system being placed on an optical axis between a plane suitable for comprising the associated object and the non-linear crystal, the optical component system comprising
an objective optical component having an entrance pupil with a first diameter $D_1$,
a primary optical component subsystem comprising
a first optical component and/or
a second optical component,
which enables forming a first image of a back-focal plane of the objective optical component, wherein the first image is formed in an infinity space on the optical axis of the microscope after the primary optical component subsystem,
wherein the optical component system is arranged for forming an external image of a back-focal plane of the objective optical component, wherein the external image is formed in an infinity space on the optical axis after the optical component system,
wherein the method further comprises
up-converting 914 infrared electromagnetic radiation redirected from optical component system in a non-linear crystal arranged for up-conversion of infrared electromagnetic radiation, the non-linear crystal being placed on the optical axis of the microscope, so as to form up-converted electromagnetic radiation,
wherein a bundle of optical paths may extend from the associated object, via the entrance pupil through the optical component system, and through the non-linear crystal, and
wherein the non-linear crystal is placed so that the external image, is situated within the non-linear crystal or in the immediate vicinity of the non-linear crystal, and
wherein an intersection between the bundle of optical paths and a plane p, 186, p290 comprising the external image, defines an area with a second diameter $D_2$, and wherein the first diameter $D_1$ is larger, such as significantly larger, than the second diameter $D_2$, and wherein the optical component system comprises
at least one refractive lens, and/or
at least three curved mirrors, and
wherein the method further comprises
forming 916 the microscopy image 142 of the associated object.

In an embodiment, there is presented a method for generating one or more monochromatic images, comprising:
scanning the associated object, and
obtaining a plurality of up-converted scanning images of the associated object, each of which scanning images corresponds to a separate position of the associated object with respect to the optical axis of the microscope, and then
generating each of the one or more monochromatic images of the associated object at one or more separate wavelengths by:
for each of the scanning images, collecting intensity information from spatial regions in the scanning image of the associated object, which spatial regions are corresponding to the wavelength of the monochromatic image,
assigning an intensity value to pixels in the monochromatic image of the associated object, said intensity value in each of said pixels being based on the intensity information from a subset of the spatial regions in the scanning image of the associated object, which subset of the spatial regions corresponds to a position of the pixel in the monochromatic image of the associated object.

The first, second and third aspect of the present invention may each be combined with any of the other aspects. These and other aspects of the invention will be apparent from and elucidated with reference to the embodiments described hereinafter.

BRIEF DESCRIPTION OF THE FIGURES

The first, second and third aspect according to the invention will now be described in more detail with regard to the accompanying figures. The figures show one way of implementing the present invention and is not to be construed as being limiting to other possible embodiments falling within the scope of the attached claim set.

FIGS. 1-5 show different embodiments of an up-conversion microscope,

DETAILED DESCRIPTION OF AN EMBODIMENT

In FIGS. 1-5 each of the objective optical component, the first optical component, the second optical component, the third optical component, the fourth optical component, the tube optical component and the eyepiece are depicted as a refractive lens. However, in specific embodiments, one or more of those optical components may be exchanged with a curved mirror, such as a reflective lens. In general, the invention may be understood to encompass a dioptrical microscope (comprising refractive lenses) and/or a catoptric microscope (comprising curved mirrors, such as reflective lenses) and/or a catadioptric microscope (comprising a combination of refractive lenses and curved mirrors, such as reflective lenses).

Figure 1:
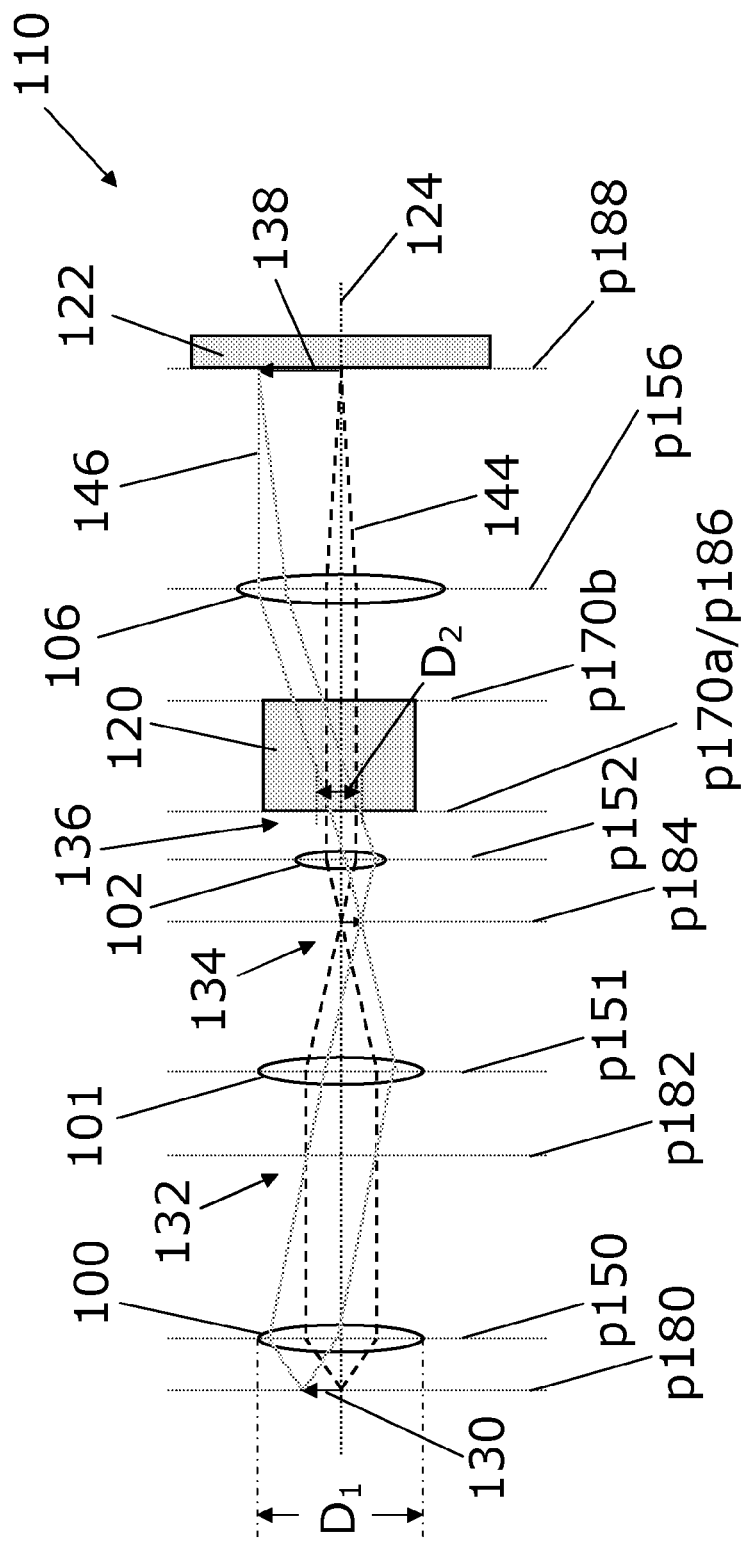

FIG. 1 shows an up-conversion infrared microscope 110 arranged for imaging an associated object 130 (pictured in the form of an upright arrow), wherein the up-conversion infrared microscope 110 comprises
- a non-linear crystal 120 arranged for up-conversion of infrared electromagnetic radiation, the non-linear crystal 120 being placed on an optical axis 124 of the microscope 110,
- an optical component system being placed on the optical axis 124 between
  - a plane p180 suitable for comprising the associated object 130, and
  - the non-linear crystal 120,
- wherein the optical component system comprises
  - an objective optical component 100 (shown in plane p150) having an entrance pupil with a first diameter
  - a primary optical component subsystem comprising
    - a first optical component 101 (shown in plane p151) and/or
    - a second optical component 102 (shown in plane p152),
  - which enables forming a first image 136 of a back-focal plane 132 (shown in plane p182) of the objective optical component 100, wherein the first image 136 is formed in an infinity space (shown situated between the second optical component 102 and the tube optical component 106 in plane p156) and on the optical axis 124 of the microscope 110 after the primary optical component subsystem,
- wherein the optical component system is arranged for forming an external image 136 of the back-focal plane 132 of the objective optical component 100, wherein the external image 136, 240 is formed in an infinity space on the optical axis 124 after the optical component system,
- wherein a bundle of optical paths may extend from the associated object 130, via the entrance pupil through the optical component system, and through the non-linear crystal 120, and
- wherein the non-linear crystal 120 is placed so that the external image 136 is situated within the non-linear crystal 120 or in the immediate vicinity of the non-linear crystal 120 (which is bounded by a front plane p170a and a rear plane 170b, respectively delimiting the non-linear crystals front and rear end), and
- wherein an intersection between the bundle of optical paths and a plane p186 comprising the external image 136 defines an area with a second diameter $D_2$, and
- wherein the first diameter $D_1$ is larger, such as significantly larger, than the second diameter $D_2$, and wherein the optical component system comprises
  - at least one refractive lens, and/or
  - at least three curved mirrors, and.

The first image 136 is shown in the immediate vicinity of the non-linear crystal 120, and more particularly as being substantially coincident with the front plane p170a of the non-linear crystal 120.

Furthermore is shown a tube optical component 106, which enables forming a microscopy image 138 of the associated object. The microscopy image 138 is the second image of the associated object, where the first image 134 of the associated object is shown in plane p184.

Furthermore is shown a photo-detector 122 which is placed so that a focal plane of the photo-detector substantially coincides with the plane p188 of the microscopy image 138 of the object. The photo-detector in the present embodiment is a charge-coupled device (CCD), which is capable of detecting the microscopy image 138 of the associated object 130 and converting the microscopy image 138 to corresponding spatially resolved image data.

Furthermore are shown light rays 144 from a lower part of object 130, as well as light rays 146 from upper part of object 130. It is noted that the light rays are not showing the limits of the bundle of optical paths.

In the specific embodiment of FIG. 1, the optical component system comprises the objective optical component 100 and the primary optical component subsystem which in turn comprises the first optical component 101 and the second optical component 102.

In the embodiment of FIG. 1 the primary optical component subsystem comprises the first optical component 101 and the second optical component 102, more particularly the primary optical component subsystem comprises the first optical component 101 and the second optical component 102 as two separate optical components. Furthermore, the primary optical component subsystem, in particular the first optical component 101 and the second optical component 102, is arranged as a 4f-system, wherein the first focal length f1 (corresponding to a distance between planes p151 and p184) of the first optical component 101 is larger than the second focal length f2 (corresponding to a distance between planes p184 and p152) of the second optical component 102.

Figure 2:
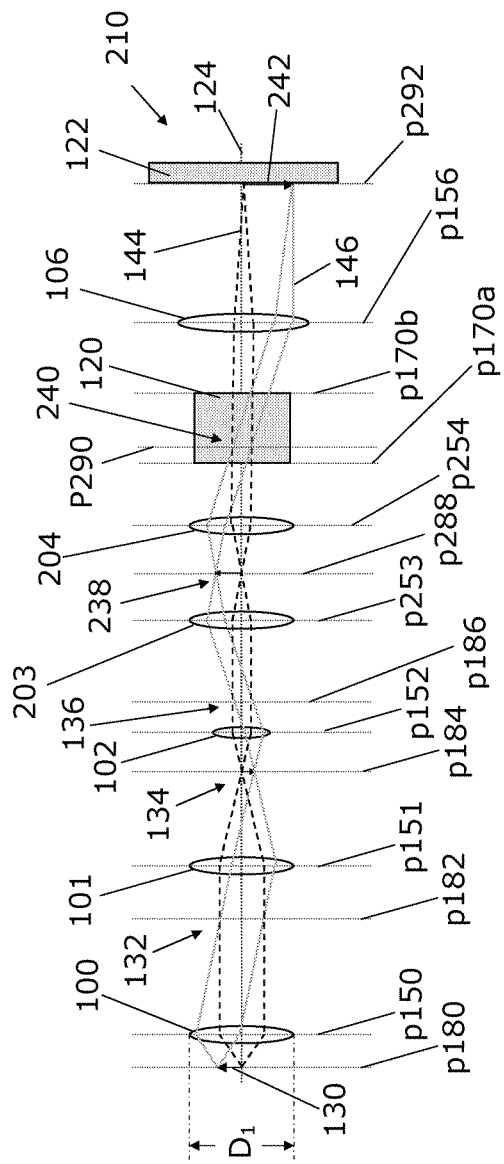

FIG. 2 shows another embodiment of an up-conversion infrared microscope 210, wherein the optical component system further comprises a secondary optical component subsystem comprising
a third optical component 203 (shown in plane p253) and/or
a fourth optical component 204 (shown in plane p254), which enables forming a second image 240 (shown in plane p290) of a back-focal plane 132 of the objective optical component 100, wherein the second image 240 is formed in an infinity space on the optical axis 124 of the microscope 210 after the secondary optical component subsystem (and in the present embodiment before the tube optical component 106).

Furthermore is shown a second image 238 (in plane p288) of object 130, which image corresponds to image 138 in FIG. 1. However, in FIG. 2, this image is not coincident with the photo-detector 122, since the focal plane of the photo-detector 122 is coincident in FIG. 2 with the microscopy image 242 (corresponding to the third image of the object). In FIG. 2, the microscopy image 242 (in plane p292) corresponds to the third image of the object 130 after the first image 134 and the second image 238.

It is noted that the remaining elements and reference signs in FIG. 2, matches up with the corresponding elements and reference signs in FIG. 1.

In FIG. 2 a first distance from the end of the primary optical component subsystem to the first image 136 of the back focal plane of the objective optical component is smaller than a second distance from the end of the secondary optical component subsystem to the second image 240 of the back focal plane of the objective optical component. In the figure, the first distance is seen as the distance from the plane p186 (of the first image 136 of the back focal plane of objective optical component 100) to the plane p152 (of the second optical component 102), whereas the second distance is shown as the distance from the plane p290 (of the second image 140 of the back focal plane of objective optical component 100) to the plane p254 (of the fourth optical component 204). The second image 240 is shown within the non-linear crystal 120.

In the embodiment of FIG. 2 the secondary optical component subsystem comprises the third optical component 203 and the fourth optical component 204, more particularly the secondary optical component subsystem comprises the third optical component 203 and the fourth optical component 204 as two separate optical components. Furthermore, the secondary optical component subsystem, in particular the third optical component 203 and the fourth optical component 204, is arranged as a 4f-system wherein the third focal length f3 (corresponding to a distance between planes p253 and p288) of the third optical component 203 is equal, such as substantially equal, to the fourth focal length f4 (corresponding to a distance between planes p288 and p254) of the fourth optical component 204.

In the embodiment of FIG. 2 a primary infinity space is situated along the optical axis between the objective optical component 100 (in plane p150) and the primary optical component subsystem, more particularly the first optical component 101 (in plane p181), and the first image 136 is a phase-conserving image of the back focal plane of the objective optical component 100.

A secondary infinity space is shown situated along the optical axis between the primary optical component subsystem and the secondary optical component subsystem, more particularly between the secondary optical component 102 (in plane p152) and the third optical component 203 (in plane p253).

A tertiary infinity space is shown situated along the optical axis between the secondary optical component subsystem, more particularly the fourth optical component 204 (in plane p254), and the tube optical component 106 (in plane p156). The second image 240 is a phase-conserving image of the back focal plane of the objective optical component 100.

Figure 3:
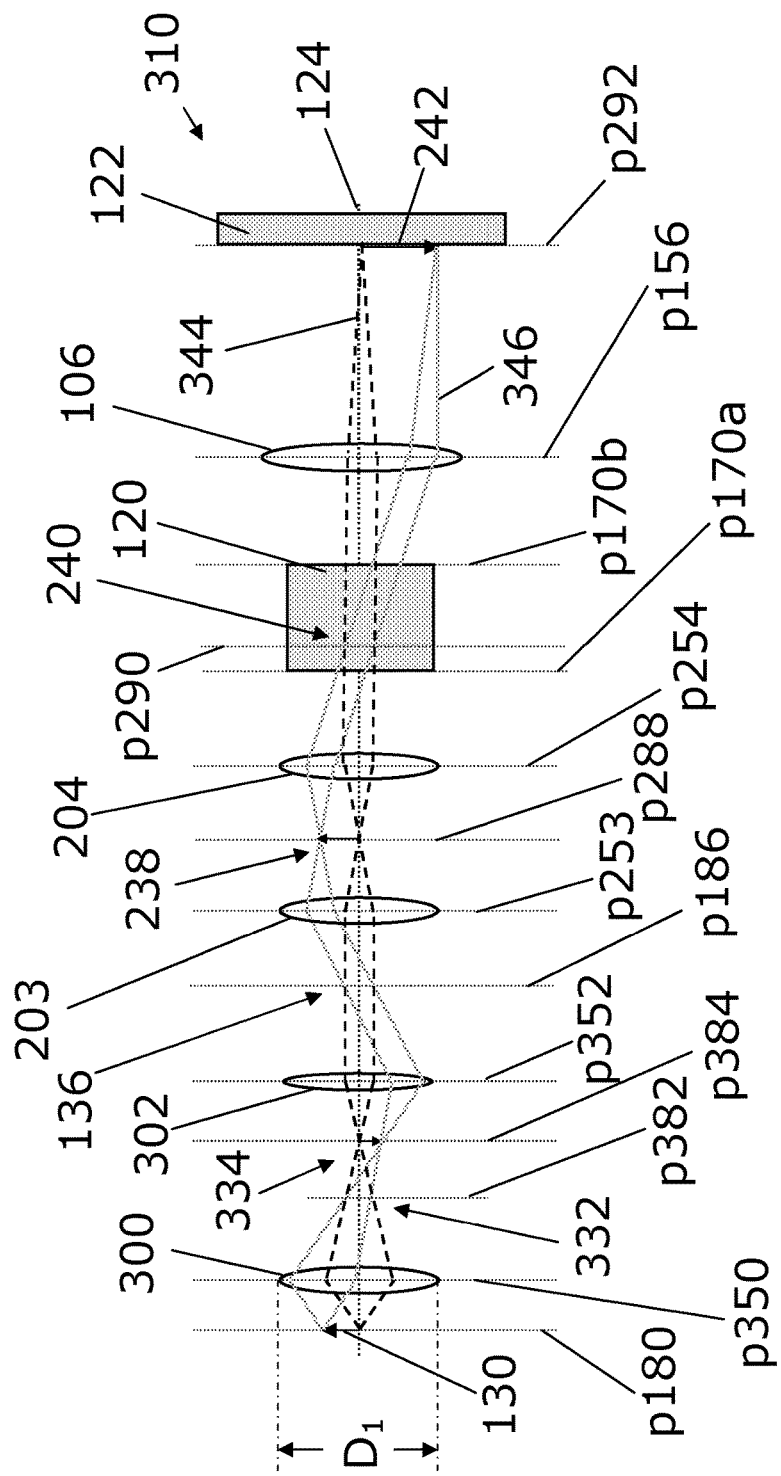

FIG. 3 shows an embodiment of a microscope 310 wherein the objective optical component 300 (in plane p350) is not arranged for gathering light from the object 130 and producing a bundle of parallel optical rays projected along the optical axis of the microscope (310) toward the primary optical component subsystem. Thus, as opposed to the embodiments shown in FIGS. 1-2, there is (in FIG. 3) no infinity space which correspond the primary infinity space (in FIGS. 1-2) immediately after the objective optical component 100. Instead, the function of the objective optical component 300 in FIG. 3 resembles the combined function of (in FIGS. 1-2) the objective optical component 100 and the first optical component 101. More particularly, the objective optical component 300 forms a (real) image 334 (in plane p384), which could be described as corresponding to (in FIGS. 1-2) the first image 134 of the associated object 130 in plane p184.

In the embodiment shown in FIG. 3, the primary optical component subsystem comprises only the second optical component 302 in plane p352 which enables forming a first image 136 of a back-focal plane 332 of the objective optical component 300, wherein the first image 136 is formed in an infinity space on the optical axis 124 of the microscope 310 after the primary optical component subsystem.

It is noted that even though there is no infinity space immediately after the objective optical component 300, there is still a back focal plane p382 of the objective optical component 300. The figure shows light rays 344 from a lower part of object 130, as well as light rays 346 from upper part of object 130, and it can be seen that parallel light rays entering into the objective optical component 300 intersect each other at a point 332 (in the back focal plane p382) after the objective optical component.

It is noted that the remaining elements and reference signs in FIG. 3, matches up with the corresponding elements and reference signs in FIGS. 1-2.

FIG. 4 shows an embodiment of a microscope 410 which is similar to the embodiment in FIG. 3 insofar as the objective optical component 300 is similar. However, as opposed to FIG. 3, there is no secondary optical component subsystem (corresponding to the second optical component 203 and fourth optical component 204 in FIG. 3). Instead, the non-linear crystal 120 is placed in the infinity space between the primary optical component subsystem, more particularly the second optical component 302, and the tube optical component 106.

Furthermore is shown a photo-detector 122 which is placed so that a focal plane of the photo-detector 122 substantially coincides with the plane p488 of the microscopy image 438 of the object, which is the second real image after the first real image 334 in plane p384.

It is noted that the remaining elements and reference signs in FIG. 4, matches up with the corresponding elements and reference signs in FIGS. 1-3.

FIG. 5 shows another embodiment of an up-conversion infrared microscope 510, wherein the microscope 510 comprises an eyepiece 508 enabling an associated human observer (such as a human observer placed in the exit pupil or eye point in plane p562) to visually observe the microscopy image of the associated object 130 through the eyepiece 508. In the present figure, the eyepiece is shown as replacing the photo-detector, but it is also possible to have an embodiment with both photo-detector and eyepiece (e.g., by using semi-transparent mirrors along the optical axis). It is noted that the remaining elements and reference signs in FIG. 5, matches up with the corresponding elements and reference signs in FIGS. 1-4.

In any embodiment of the microscope, such as in any embodiments shown in FIGS. 1-5, an up-conversion infrared microscope, the up-conversion infrared microscope may be arranged so as to enable imaging of the associated object 130, wherein the associated object 130 is closer to the objective optical component than a first image of the associated object within the microscope. For example, in FIG. 1 the distance between plane p180 (with the object 130) and plane 150 (with the objective optical component 100) may be smaller than a distance between plane 150 (with the objective optical component 100) and plane p184 (with the first (real) image 134 of the object 130).

Figure 6:
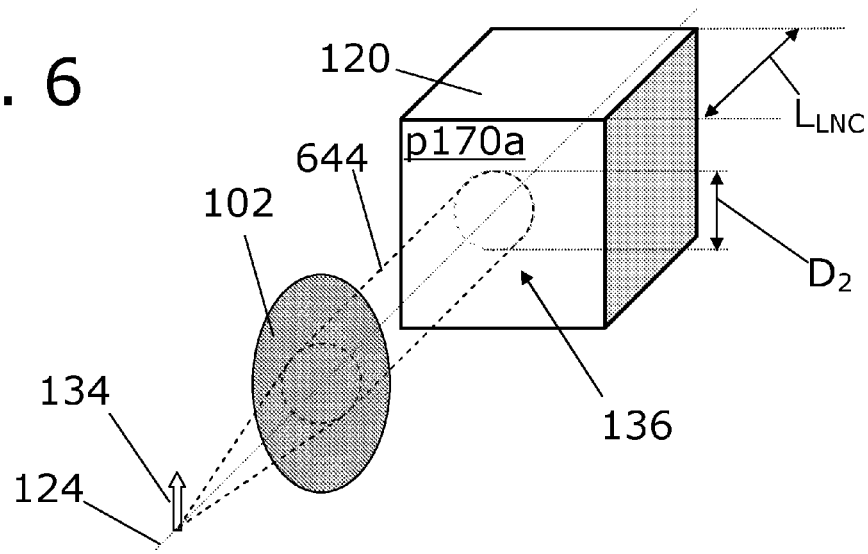
FIG. 6 shows a perspective view of a portion of an up-conversion microscope.

FIG. 6 shows a perspective drawing corresponding to a portion of FIG. 1, including the first image 134 of the associated object, the second optical component 102, a bundle of optical paths (depicted as light rays) 644 from the associated object shown around the optical axis 124, the non-linear crystal 120 which is bounded by a front plane p170a, the first image 136 of a back-focal plane of the objective optical component.

The bundle of optical paths 644 extends from the associated object, via the entrance pupil through the optical component system. Thereafter they are imaged as circular cylindrical bundle of light rays, which illustrate the infinity space which is shown situated along the optical axis between the primary optical component subsystem, more particularly the second optical component 102, and the tube optical component 106 (not shown). The first image 136 is a phase-conserving image of the back focal plane of the objective optical component (not shown).

The bundle of optical paths 644 passes through the non-linear crystal 120 (and through the front plane p170a of the non-linear crystal). The non-linear crystal 120 is placed so that the external image 136 is situated substantially coincident with the front plane p170a of the non-linear crystal 120.

The intersection between the bundle of optical paths 644 and a plane comprising the external image (which in the present embodiment is identical with the first image 136 of the back focal plane of the objective optical component) defines an area with a second diameter (D2).

The length $L_{LNC}$ of the non-linear crystal 120 is also indicated.

Figure 7:
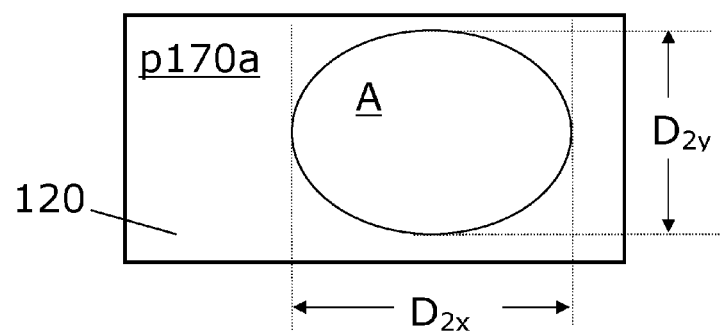
FIG. 7 shows an end-view of the non-linear crystal.

FIG. 7 corresponds to FIG. 6 but shows an end view of the front plane p170a (i.e., the observer is understood to be somewhere along the optical axis, and looking towards the non-linear crystal 120). For generality, the intersection between the bundle of optical paths and a plane comprising the external image (which in the present embodiment is identical with the first image 136 of the back focal plane of the objective optical component) is shown as an ellipsoid rather than a circle, and having major diameter $D_{2x}$ and minor diameter $D_{2y}$. The area A of the intersection is also indicated. However, while 'diameter' may be understood to refer to circular areas, it is understood that also non-circular areas are encompassed by the present invention, and the second diameter $D_2$ may in those cases be understood to be given by $$D_2 = \mathrm{squareroot}(4*A/\mathrm{pi})$$

where A is the area of the intersection in the plane of the external image orthogonal to the optical axis.

Figure 8:
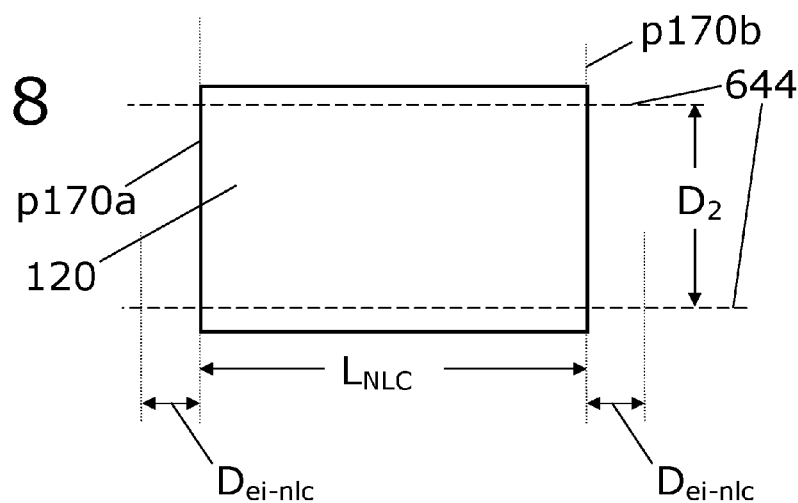
FIG. 8 shows a side view of the non-linear crystal.

FIG. 8 corresponds to FIGS. 6-7 but shows a side view of the front plane non-linear crystal 120 (i.e., the observer is understood to be somewhere off the optical axis, at a position corresponding to the non-linear crystal 120 and looking towards the non-linear crystal 120). The external image 136 is not shown, but it could be anywhere within the non-linear crystal 120 with width $L_{NLC}$ or in the immediate vicinity of the non-linear crystal 120, which may in some embodiments be understood to be within a distance given by within a distance $D_{ei\text{-}nlc}$ from the non-linear crystal, such as from any part of the non-linear crystal, given by $$D_{ei\text{-}nlc} = n(D2/D1)(D2+w0)F/R, \text{ where}$$

F is a focal length of the objective optical component,
R is a radius of an area of the associated sample which the microscope is arranged for imaging
$w_0$ is the diameter of the laser beam, such as the diameter of the laser beam at the non-linear crystal, such as the diameter of the laser beam at the non-linear crystal at the end of the non-linear crystal being closest to the external image if the external image is not within the non-linear crystal. A central plane of the non-linear crystal 120 is given by a plane being positioned within the non-linear crystal 120 equal distances from a front plane p170a and a rear plane p170b of the non-linear crystal 120. A length $L_{NLC}$ of the non-linear crystal 120 is defined by a distance between the front plane p170a and the rear plane p170b of the non-linear crystal. In exemplary embodiments, the length of the crystal could be, e.g., 20 mm.

Figure 9:
FIG. 9 shows a flow chart of a method according to the invention.

FIG. 9 shows a method 910 for providing forming a microscopy image 142 of an associated object 130, wherein the microscopy image 142 is based on infrared electromagnetic radiation emitted from the object 130, the method comprising Redirecting s914 electromagnetic radiation from the associated object using an optical component system being placed on an optical axis 124 between a plane p180 suitable for comprising the associated object 130 and the non-linear crystal 120, the optical component system comprising
an objective optical component 100 having an entrance pupil with a first diameter $D_1$,
a primary optical component subsystem comprising
a first optical component (101) and/or
a second optical component (102),
which enables forming a first image 136 of a back-focal plane 132 of the objective optical component 100, wherein the first image 136 is formed in an infinity space on the optical axis 124 of the microscope 110 after the primary optical component subsystem,
wherein the optical component system is arranged for forming an external image 136, 240 of a back-focal plane 132 of the objective optical component 100, wherein the external image 136, 240 is formed in an infinity space on the optical axis 124 after the optical component system, wherein the method further comprises
up-converting s916 infrared electromagnetic radiation redirected from optical component system in a non-linear crystal 120 arranged for up-conversion of infrared electromagnetic radiation, the non-linear crystal 120 being placed on the optical axis 124 of the microscope 110, so as to form up-converted electromagnetic radiation, wherein a bundle of optical paths may extend from the associated object 130, via the entrance pupil through the optical component system, and through the non-linear crystal 120, and wherein the non-linear crystal 120 is placed so that the external image 136, 240 is situated within the non-linear crystal 120 or in the immediate vicinity of the non-linear crystal 120, and wherein an intersection between the bundle of optical paths and a plane p, 186, p290 comprising the external image 136, 240 defines an area with a second diameter $D_2$, and wherein the first diameter $D_1$ is larger, such as significantly larger, than the second diameter $D_2$, and wherein the optical component system comprises
at least one refractive lens, and/or
at least three curved mirrors, and
wherein the method further comprises
forming s918 the microscopy image 142 of the associated object 130.

Microscope Spatial Resolution Verification

Figure 10:
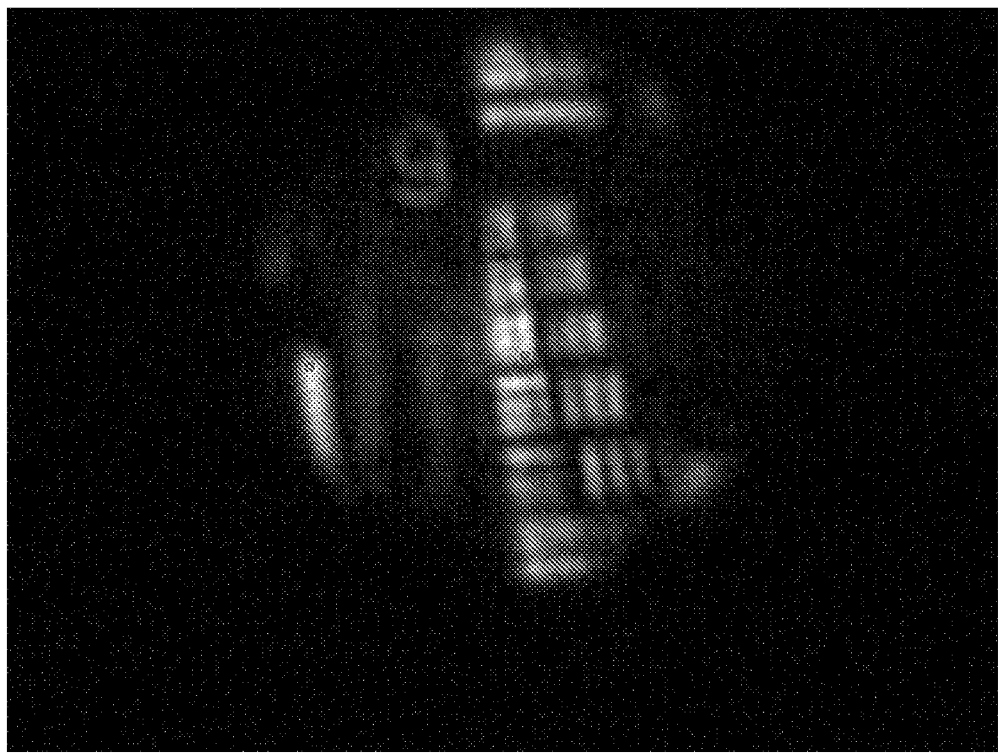
FIG. 10 shows a microscopy image obtained with a microscope according to an embodiment of the invention.

FIG. 10 shows a microscopy image obtained with a microscope according to an embodiment of the invention which is described in greater detail with reference to FIG. 13 below. The image depicts a test target. The smallest pattern is '7-6'. The first discernible line pattern is two below that (7-4). Test pattern 7-4 is just discernible. This pattern has 181 line pairs per mm. This corresponds to 5.5 µm/line pair or a spatial element size of 2.8 µm.

FIG. 10 shows that it may be possible to achieve diffraction limited performance using, e.g., a Germanium lens, such as a lens having a focal length f=25 mm, such as a lens having a diameter, as the objective optical component. The wavelength used in the experiment was 2.7 micrometers.

Wavelength Calibration

To verify that the imaged wavelengths correspond to the wavelengths which the system has been designed for, a spectrum of a hot water vapor from a flame was acquired.

Figure 11:
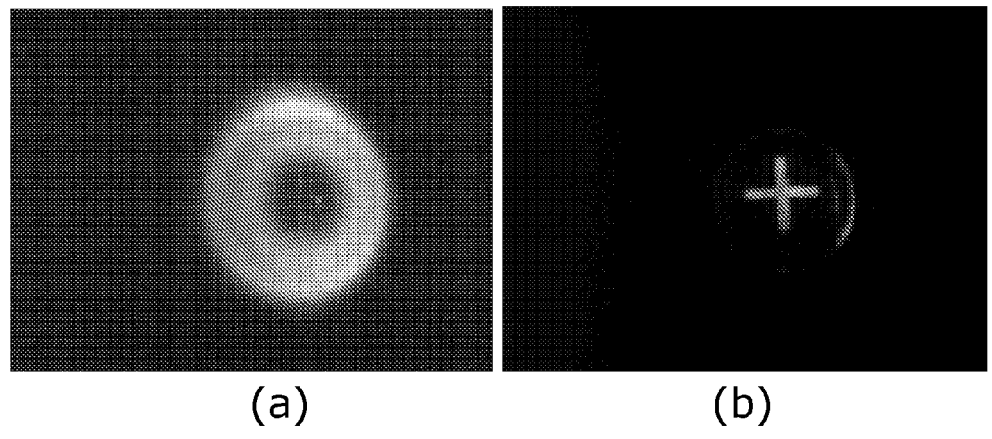
FIG. 11 shows an image of emission from hot water vapour.

FIG. 11 shows (a) emission from hot water vapour (left), and (b) the cross (right) can be used to (later) calibrate the wavelength scale absolutely from a known centre wavelength.

Figure 12:
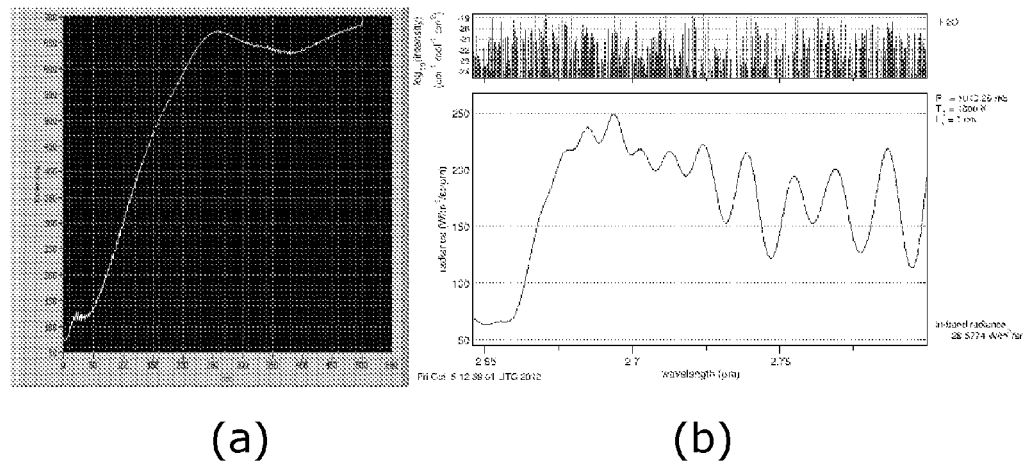
FIG. 12 shows a spectrum obtained with the microscope.

FIG. 12 shows (a) a conversion of the image in FIG. 11 (left) into a spectrum, and (b) what it should look like theoretically (right). The left part of the spectrum (in FIG. 12(a)) corresponds to the central region of the image (in FIG. 11(a)).

FIGS. 11-12 shows that the spectral functionality works as intended.

Exemplary Setup for Zeolite Measurements

In the present embodiment, the microscope and use thereof is described with reference to the exemplary sample of 'zeolites'.

The zeolites were measured in two different configurations, both using a superK light source for illumination. In one configuration the superK is placed directly behind the zeolite capillary tube. I.e. the capillary tube is placed where the resolution test target was placed in the resolution measurements above, with no other changes to the setup.

Figure 13:
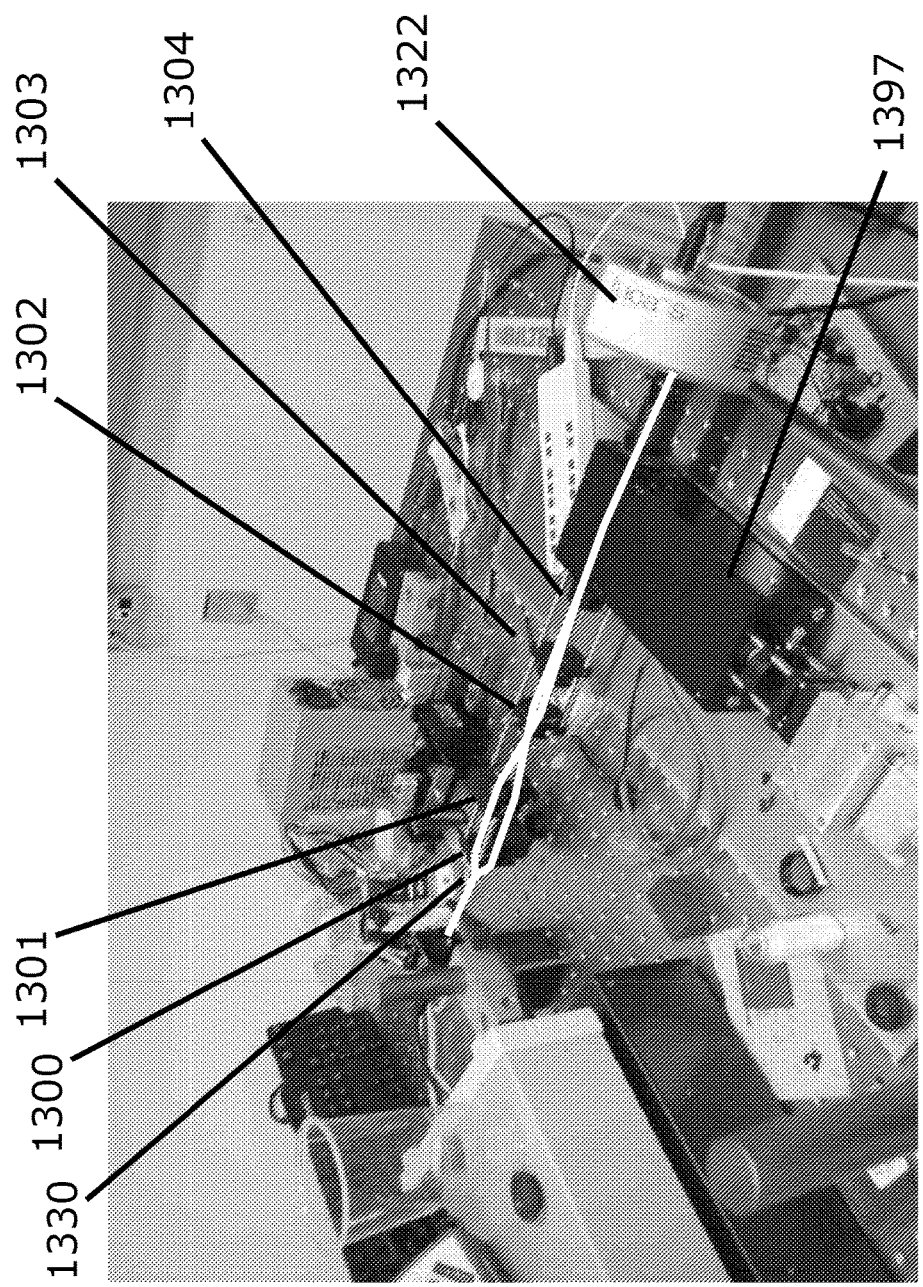
FIG. 13 shows an exemplary setup of an up-conversion microscope.

FIG. 13 shows an exemplary setup of an up-conversion microscope, more particularly an overview of the experimental setup. Here the superK (at the origin of indicated optical path, i.e., at the left side of the optical path) is used to rear-illuminate the zeolites. Light is scattered (and absorbed) diffusely as it randomly passes through the sample. The microscope optics, i.e., the optical component system forms an external image of the objective lens into a non-linear crystal (inside the dark box, not visible in the figure) which enables up-conversion, so that the light is transformed to visible light for detection on an Andor Luca S camera.

The figure shows the associated sample 1330, the objective optical component 1300, which is a lens with focal length 25 mm, the first optical component 1301, which is a lens with focal length 75 mm, the second optical component 1302, which is a lens with focal length 1.8 mm, the third optical component 1303, which is a lens with focal length 40 mm, the fourth optical component 1304, which is a lens with focal length 40 mm. All lenses have diameter Ø=25 mm. The objective, first and second optical components are aspherical lenses with diffraction limited performance. The third and fourth optical components are normal plano-convex spherical lenses. The objective and first optical components are bought at Edmund Optics with product codes NT68-246 and NT68-250. The second, third and fourth optical components are from Thorlabs with product codes C037TME-D (the second lens) and LA5370-E (third and fourth lens).

The photo-detector 1322 is a CCD (Andor Luca S). Between the objective optical component and the CCD there are placed filters to remove unwanted wavelengths. In the present setup there is used Thorlabs FEL0700 (longpass 700 nm), FES0800 (shortpass 800 nm), FES1000 (shortpass 1000). FES1000 could be replaced with a Semrock notch filter which removes 1064+532 nm men transmits outside these wavelengths.

The laser system shown in box 1397 is similar to the system shown in FIG. 1C and described in "Methods" of the article (featuring the present inventors as authors) "Room-temperature mid-infrared single-photon spectral imaging", Nature Photonics 6, 788-793 (2012), which is hereby included by reference in entirety, in particular FIG. 1 of the article and the associated description relating to the setup is included by reference. The only difference is that the poling periods in the non-linear crystal have been changed and that the crystal is mounted on a motorized z-stage so that the poling period could be changed quickly. The exemplary specific embodiment is described in more detail in the appended annex.

The light source applied is the SuperK source from the company NKT Photonics—which is a powerful light source.

The other configuration is where the superK light source is illuminating the zeolites from the front-side, however, at an angled geometry (approximately 60° incidence angle).

FIGS. 10-13 and 17-18 show that the microscope enables a user to measure images with diffraction limited performance and to obtain corresponding spectra. These measurements show clear absorption peaks, which enables obtaining chemical information.

Figure 14:
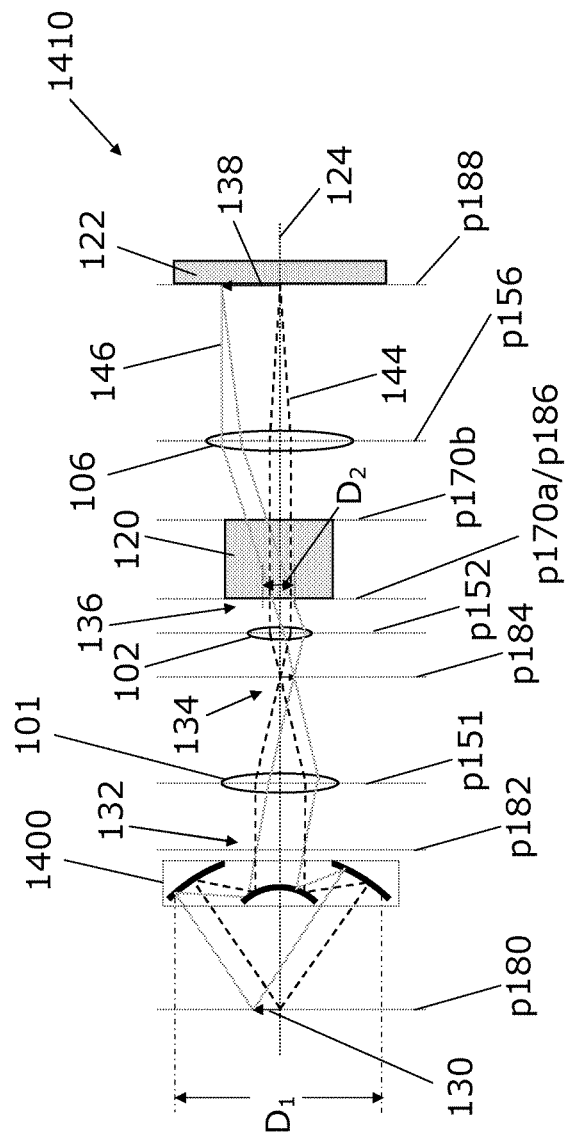
FIG. 14 shows an embodiment of comprising a reflective objective.

FIG. 14 shows another embodiment of an up-conversion infrared microscope 1410, wherein the objective component 1400 comprises a reflective objective. A possible advantage of a reflective objective, such as the depicted reflective objective with two reflective surfaces, may be that it enables having a relatively large working distance for a given effective focal length. Another possible advantage of a reflective objective, such as the depicted reflective objective with two reflective surfaces, may be that it enables having a relatively large entrance pupil diameter $D_1$ compared to a size of a smaller exit pupil. Yet another possible advantage of such optical reflective objective component may be, that it is robust with respect to changes in wavelengths since it does not suffer from chromatic aberrations in the same way as refractive lenses may do. It is noted, that a reflective objective, such as the reflective objective 1400, may not easily enable having $D_1$ being larger, such as significantly larger, than $D_2$, and in particular may not easily enable for small absolute values of $D_1$ and/or $D_2$ while still having $D_1$ being larger, such as significantly larger, than $D_2$. It is noted in this regard, that providing a reflective objective with less than 3 curved mirrors which enables, e.g., a $D_1$=25 mm and $D_2$=0.5 mm may be impossible or next to impossible, since it would require one or two mirrors shaped with challenging curvatures and extremely small tolerances. In contrast with this, having at least one refractive lens or more than two curved mirrors may enable relatively easily designing and producing a microscope which has substantially any $D_1$ and any $D_2$, for example $D_1$=25 mm and $D_2$=0.5 mm as shown in the example section.

Figure 15:
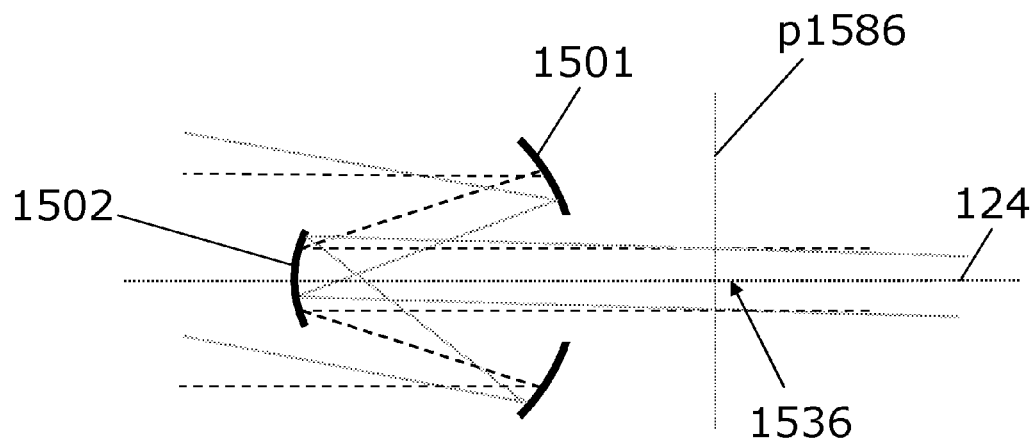
FIG. 15 shows an alternative primary optical component subsystem.

FIG. 15 shows an alternative primary optical component subsystem, which could for example, replace the first optical the first optical component (101) and the second optical component (102) of the primary optical component subsystem of FIG. 14. The primary optical component subsystem of FIG. 15 comprises a primary optical component 1501 and a secondary optical component 1502, both of which are concave mirrors, which enables forming a first image 1536 (in plane p1586) of a back-focal plane of an objective optical component (not shown in FIG. 15), wherein the first image 1536 is formed in an infinity space on the optical axis 124 of the microscope after the primary optical component subsystem. A possible advantage of such optical component subsystem may be, that it is robust with respect to changes in wavelengths since it does not suffer from chromatic aberrations in the same way as refractive lenses may do.

Figure 16:
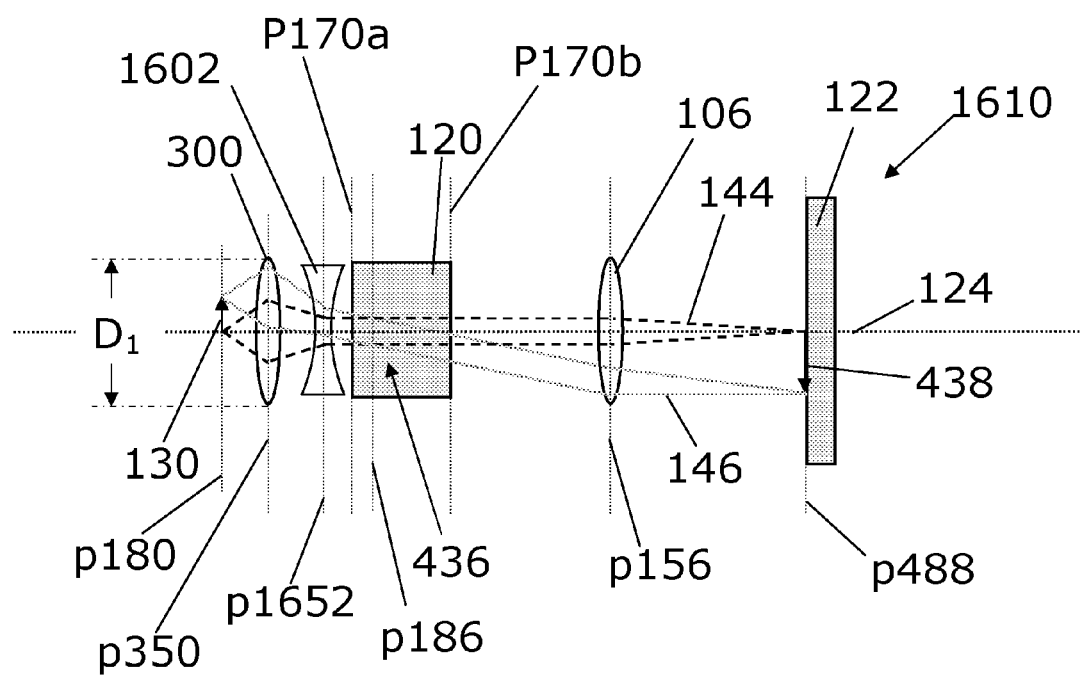
FIG. 16 shows an embodiment with a diverging lens.

FIG. 16 shows an embodiment of the microscope 1610 with a diverging lens 1602 inserted in plane p1652. A possible advantage of this embodiment may be, that the total length of the optical component system, such as the optical component system and non-linear crystal, such as the microscope, may be kept relatively short. Another possible advantage of a reflective objective, such as the depicted reflective objective with two reflective surfaces, may be that it enables having a relatively large working distance for a given effective focal length. Yet another possible advantage of the depicted embodiment with a diverging lens, may be that it enables having a relatively large entrance pupil diameter D1 compared to a size of a smaller exit pupil.

Figure 17:
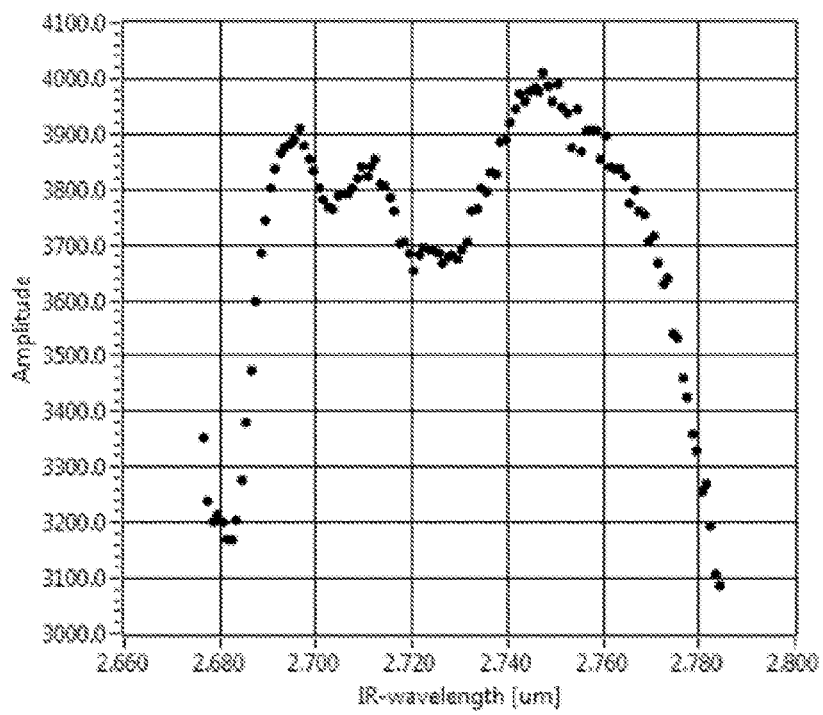
FIG. 17 shows a spectrum corresponding to a conversion of the image in FIG. 18 into a spectrum.
Figure 18:
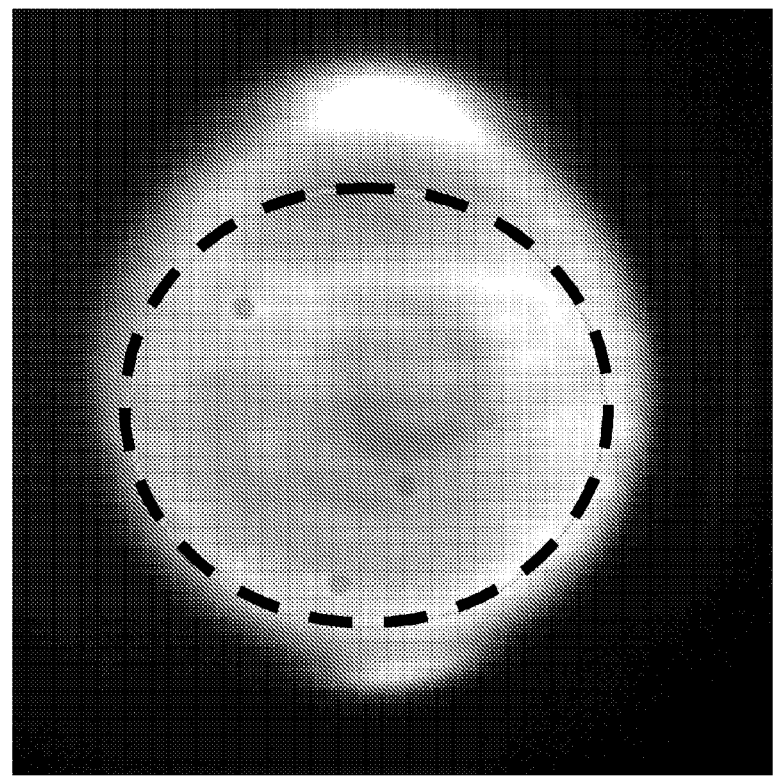
FIG. 18 shows an image of the zeolites described in connection with FIG. 13, FIG. 19 show scanning images from a data series used to reconstruct multiple monochromatic images as depicted in FIG. 20, FIG. 20 show monochromatic images generated form the scanning images depicted in FIG. 19.

FIG. 17 shows a spectrum which corresponds to a conversion of the image in FIG. 18 (more specifically the selected central region delimited by the dotted line in FIG. 18) into a spectrum. This particular spectrum is obtained at a poling length of the crystal of T=20.155 micrometer, and a temperature of 25 degree Celcius. It is noted that the microscope has been calibrated so that the wavelengths measured can be ascribed to absolute values. The wavelengths in this particular figure (i.e., the values on the horizontal x-axis) spans a region from 2660 micrometer to 2800 micrometer. It is evident from the data, that three absorption dips can be observed in the data, i.e., localized decreases in intensity at ca. 2682 micrometer, 2703 micrometer, and 2725 micrometer. The latter dip at 2725 micrometer may be composed of two adjacent dips, which could probably be resolved, e.g., if data had been gathered for a longer period of time or a more intense light source had been applied.

It is noted, that it may be seen as an advantage of embodiments of the present invention, that the microscope enables imaging, which in turn enables section of certain parts of the image (corresponding to certain parts of the sample) from which specific spectral information may be provided.

FIG. 18 shows an image of the zeolites described in connection with FIG. 13. Note, however, that the sample was moved during imaging (hence the apparent blurring of the image data), i.e., during exposure, so as to enable obtaining spectral information from a larger area than the field of view, i.e., effectively averaging information from a larger area of the imaged sample. The spectral information used in the spectrum of FIG. 17 originates from the selected central region delimited by the dotted line.

Generating One or More Images at One or More Separate Wavelengths

The images obtained by upconversion are characterized by a constant spatial resolution, but with a spectral resolution that depends on the distance from the image center. The span of wavelengths that are imaged will also depend on the distance from the image center.

Thus, a spatial region in an up-converted image of the associated object, may correspond to a specific wavelength region or wavelength.

In embodiments, there is provided a microscope and method for generating one or more images, each of which images corresponding to a separate wavelength, such as the images being monochromatic and corresponding to different wavelengths. By 'monochromatic image' is understood an an image from a spectrally delimited portion of the electromagnetic spectrum, such as the image corresponding to a relatively narrow portion of the electromagnetic spectrum, such as less than 100 nm, such as less than 50 nm, such as less than 25 nm, such as less than 10 nm, such as less than 5 nm, such as less than 2 nm, such as less than 1 nm. For a plurality of monochromatic images, it may also be understood, that each of the monochromatic images correspond to a separate region of wavelengths, such as a separate wavelength. However, even for a monochromatic image corresponding to a finite range of wavelengths, it is readily understood by the skilled person, that each monochromatic image may correspond to a specific wavelength, such as a center wavelength within a wavelength region.

The embodiment is based on scanning the associated object, such as the associated object being a sample with finite extension in the object plane (corresponding to the front focal plane of the optical component system), such as scanning the associated object within the microscope's field of view, and obtaining a set of up-converted scanning images of the associated object, each of which scanning images corresponds to a separate position of the associated object with respect to the optical axis of the microscope, and then generating each of the one or more monochromatic images of the associated object at one or more separate wavelengths by:

for each of the one or more scanning images, collecting intensity information from spatial regions in the scanning image of the associated object, which spatial regions are corresponding to the wavelength of the monochromatic image, assigning an intensity value to pixels in the monochromatic image of the associated object, said intensity value in each of said pixels being based on the intensity information from a subset of the spatial regions in the scanning image of the associated object, which subset of the spatial regions corresponds to a position of the pixel in the monochromatic image of the associated object (where this latter step may be referred to as reconstruction of the monochromatic image).

It may be understood that the embodiment comprises collecting spectral information for the points on the associated object, such as a sample, from the differing phasematched wavelengths in the different parts of each scanning image, In embodiments, the method and microscope for generating one or more images, each of which images corresponding to a separate wavelength, may be referred to as a method and system for multispectral or hyperspectral imaging.

An advantage of this embodiment is that the imaged span of wavelengths is independent of the position in the monochromatic image after reconstruction of the monochromatic image.

The wavelengths that are imaged may depend on the temperature and/or poling period and/or other phasematching features.

In the center of each of the scanning images, the spectral resolution is limited by the phasematching condition of the frequency conversion process, determined by the length of the crystal. Further from the center, the spectral resolution is also limited by the effects of non-collinear phasematch conditions.

The reason why the spectral resolution depends on the position within the field of view is that the phasematched wavelength changes faster further from the image center, while the spatial resolution, limited by the spot size of the laser in the crystal, remains constant.

Scanning of the associated object may be carried out by relative movement of the microscope and the associated object, such as by moving the associated object. The scanning may be carried out by moving the field of view. Computer controlled motors can be used for moving the associated object and for capturing scanning images for multiple different positions within the field of view.

By this embodiment, in principle any size of object can be scanned to obtain a monochromatic image, such as a multispectral or hyperspectral image, since each point in the associated object will be imaged multiple times, where each image yields spectral information from for a separate wavelength that are phasematched in the microscope, in particular when scanning/sampling finely enough.

Figure 19:
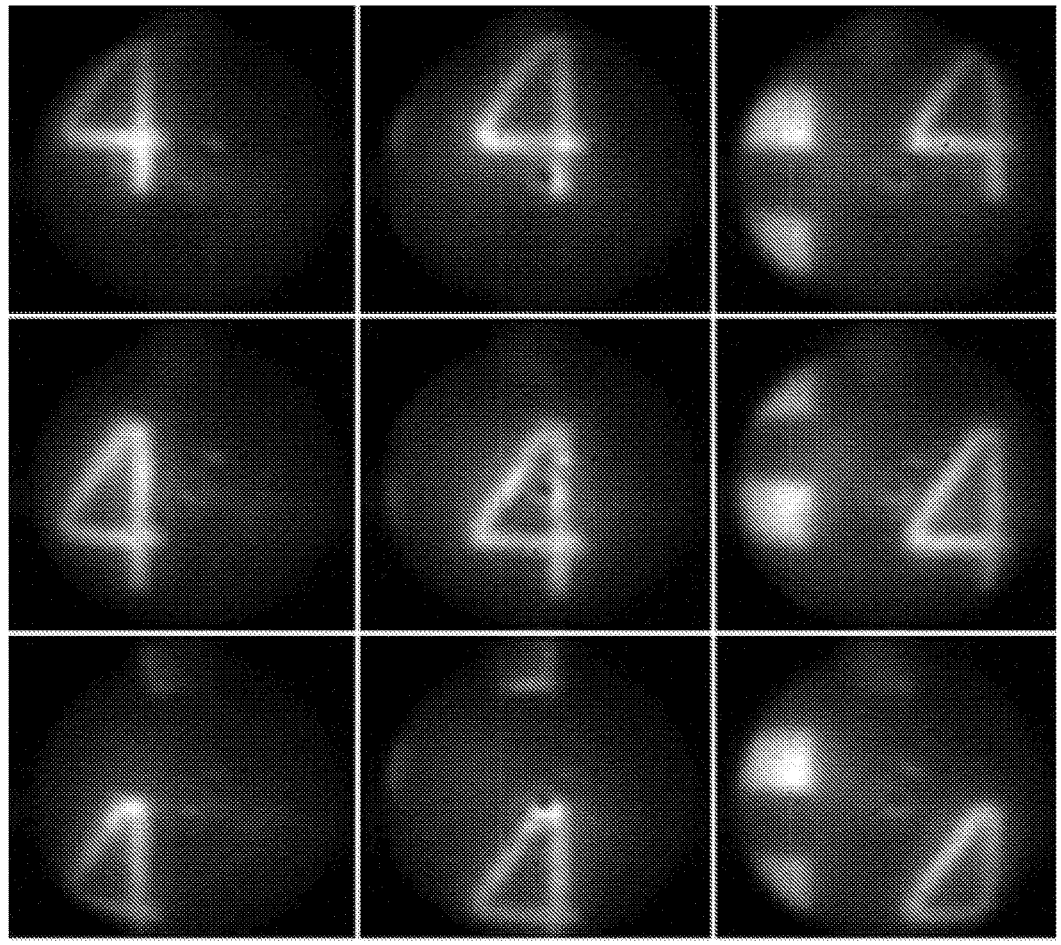
Figure 20:
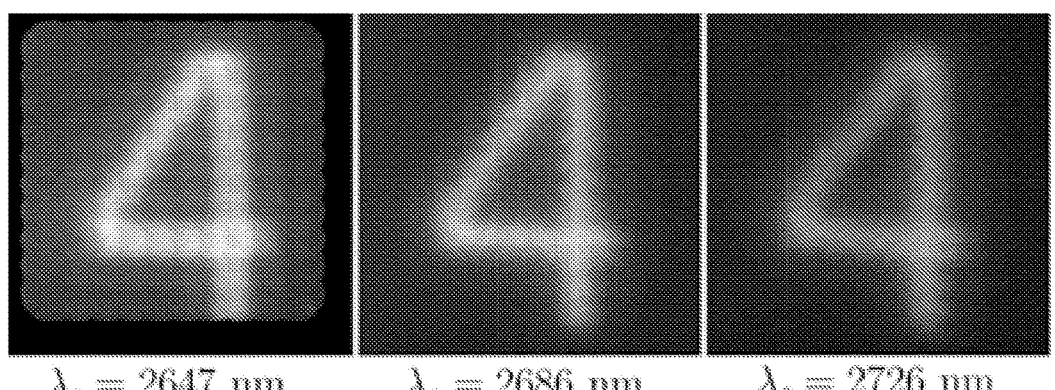

FIGS. 19-20 show a microscopy image where a resolution target has been resolved to group '7-6', corresponding to 228 linepairs/mm.

FIG. 19 show 9 'scanning images' from a data series used to reconstruct multiple monochromatic images, which may be referred to as generating multispectral or hyperspectral image information (cf., FIG. 20).

FIG. 20 show 3 monochromatic images generated form the 'scanning' images depicted in FIG. 19. The 3 monochromatic images in FIG. 20 correspond from left to right, respectively, to monochromatic images obtained at 2647 nm, 2686 nm, and 2726 nm.

To sum up, there is presented an up-conversion infrared microscope (110) arranged for imaging an associated object (130), wherein the up-conversion infrared microscope (110) comprises a non-linear crystal (120) arranged for up-conversion of infrared electromagnetic radiation, and wherein an objective optical component (100) has an entrance pupil with a first diameter $D_1$, and an optical component system which is arranged for forming an external image (136) of the back-focal plane (132) of the objective optical component (100), which has a diameter (given by the diameter of a circle enclosing all optical paths at the plane of the external image) which is denominated $D_2$ and wherein $D_1$ is larger, such as significantly larger, than a second diameter $D_2$.

In alternative embodiments, there is presented embodiments E1-E15 below:

1. An up-conversion infrared microscope (110) arranged for imaging an associated object (130), wherein the up-conversion infrared microscope (110) comprises
    a non-linear crystal (120) arranged for up-conversion of infrared electromagnetic radiation, the non-linear crystal (120) being placed on an optical axis (124) of the microscope (110),
    an optical component system being placed on the optical axis (124) between
        a plane (p180) suitable for comprising the associated object (130), and
        the non-linear crystal (120),
    wherein the optical component system comprises
        an objective optical component (100) having an entrance pupil with a first diameter ($D_1$),
        a primary optical component subsystem comprising
            a first optical component (101) and/or
            a second optical component (102),
            which enables forming a first image (136) of a back-focal plane (132) of the objective optical component (100), wherein the first image (136) is formed in an infinity space on the optical axis (124) of the microscope (110) after the primary optical component subsystem,
    wherein the optical component system is arranged for forming an external image (136, 240) of the back-focal plane (132) of the objective optical component (100), wherein the external image (136, 240) is formed in an infinity space on the optical axis (124) after the optical component system,
    wherein a bundle of optical paths may extend from the associated object (130), via the entrance pupil through the optical component system, and through the non-linear crystal (120), and
    wherein the non-linear crystal (120) is placed so that the external image (136, 240) is situated within the non-linear crystal (120) or in the immediate vicinity of the non-linear crystal (120), and
    wherein an intersection between the bundle of optical paths and a plane (p186, p290) comprising the external image (136, 240) defines an area with a second diameter ($D_2$), and
    wherein the first diameter ($D_1$) is larger than the second diameter ($D_2$), and
    wherein the optical component system comprises
        at least one refractive lens, and/or
        at least three curved mirrors.
2. An up-conversion infrared microscope (110) according to embodiment E1 wherein the first diameter ($D_1$) is at least 2 times larger than the second diameter ($D_2$).
3. An up-conversion infrared microscope (110) according to any of the preceding embodiments wherein the second diameter $D_2$ is less than 3 mm.
4. An up-conversion infrared microscope (110) according to any of the preceding embodiments wherein the first diameter $D_1$ is at least 3 mm.

5. An up-conversion infrared microscope (110) according to any of the preceding embodiments, wherein the working distance of the microscope is at least as large as the second diameter $D_2$.

6. An up-conversion infrared microscope (210) according to any of the preceding embodiments wherein the optical component system further comprises
a secondary optical component subsystem comprising
a third optical component (203) and/or
a fourth optical component (204),
which enables forming a second image (240) of a back-focal plane (132) of the objective optical component (100), wherein the second image (240) is formed in an infinity space on the optical axis (124) of the microscope (110) after the secondary optical component subsystem.

7. An up-conversion infrared microscope (210) according to embodiment E6 wherein a first distance from the end of the primary optical component subsystem to the first image (136) of the back focal plane of the objective optical component is smaller than a second distance from the end of the secondary optical component subsystem to the second image (240) of the back focal plane of the objective optical component.

8. An up-conversion infrared microscope (110) according to any of the preceding embodiments wherein the primary optical component subsystem comprises the first optical component (101) and the second optical component (102).

9. An up-conversion infrared microscope (210) according to any one of embodiments E6-E8 wherein the secondary optical component subsystem comprises the third optical component (103) and the fourth optical component (104).

10. An up-conversion infrared microscope (110) according to embodiment E9 wherein a primary infinity space is situated along the optical axis between the objective optical component (100) and the primary optical component subsystem, and wherein the first image (136) is a phase-conserving image of the back focal plane of the objective optical component (100).

11. An up-conversion infrared microscope (110) according to any of the preceding embodiments wherein the microscope (110) further comprises:
an eyepiece (508) enabling an associated human observer to visually observe the microscopy image of the associated object (130) through the eyepiece (508), and/or
a photo-detector (122), such as a charge-coupled device (CCD), which is capable of detecting the microscopy image (138, 242) of the associated object (130) and converting the microscopy image (138, 242) to corresponding spatially resolved image data.

12. An up-conversion infrared microscope (110) according to any of the preceding embodiments wherein the up-conversion infrared microscope (110) is arranged so as to enable imaging of the associated object (130), wherein the associated object (130) is closer to the objective optical component (100) than a first image (134) of the associated object within the microscope (110).

13. An up-conversion infrared microscope (110) according to any of the preceding embodiments, further comprising a light source, such as a laser, arranged for emitting a beam of narrow band light, such as a laser beam, onto the non-linear crystal, which beam of narrow band light, such as the laser beam, is arranged for having a diameter of $w_0$ at the non-linear crystal, wherein the external image, is situated inside the non-linear crystal or within a distance $D_{ei-nlc}$ from the non-linear crystal given by $$D_{ei-nlc} = n(D_2/D_1)(D_2+w_0)F/(R),$$

where
F is a focal length of the objective optical component,
R is a radius of an area of the associated sample which the microscope is arranged for imaging,
$w_0$ is a diameter of the narrow band light,
n is a refractive index of a medium in the microscope.

14. Use of a microscope according to any of the preceding embodiments for providing up-converted EMR so as to form a microscopy image based on the up-converted EMR and/or for obtaining spectral information from the associated object.

15. A method for providing forming a microscopy image (142) of an associated object (130), wherein the microscopy image (142) is based on infrared electromagnetic radiation emitted from the object (130), the method comprising
Redirecting (s912) electromagnetic radiation from the associated object using an optical component system being placed on an optical axis (124) between a plane (p180) suitable for comprising the associated object (130) and the non-linear crystal (120), the optical component system comprising
an objective optical component (100) having an entrance pupil with a first diameter ($D_1$),
a primary optical component subsystem comprising a first optical component (101) and/or a second optical component (102), which enables forming a first image (136) of a back-focal plane (132) of the objective optical component (100), wherein the first image (136) is formed in an infinity space on the optical axis (124) of the microscope (110) after the primary optical component subsystem,
wherein the optical component system is arranged for forming an external image (136, 240) of a back-focal plane (132) of the objective optical component (100), wherein the external image (136, 240) is formed in an infinity space on the optical axis (124) after the optical component system,
wherein the method further comprises
up-converting (s914) infrared electromagnetic radiation redirected from optical component system in a non-linear crystal (120) arranged for up-conversion of infrared electromagnetic radiation, the non-linear crystal (120) being placed on the optical axis (124) of the microscope (110), so as to form up-converted electromagnetic radiation,
wherein a bundle of optical paths may extend from the associated object (130), via the entrance pupil through the optical component system, and through the non-linear crystal (120), and
wherein the non-linear crystal (120) is placed so that the external image (136, 240) is situated within the non-linear crystal (120) or in the immediate vicinity of the non-linear crystal (120), and
wherein an intersection between the bundle of optical paths and a plane (p, 186, p290) comprising the external image (136, 240) defines an area with a second diameter ($D_2$), and wherein the first diameter ($D_1$) is larger than the second diameter ($D_2$), and wherein the optical component system comprises
at least one refractive lens, and/or
at least three curved mirrors, and
wherein the method further comprises
forming (s916) the microscopy image (142) of the associated object (130).

For the above embodiments E1-E15, it may be understood that reference to preceding 'embodiments' may refer to preceding embodiments within embodiments E1-E15.

Although the present invention has been described in connection with the specified embodiments, it should not be construed as being in any way limited to the presented examples. The scope of the present invention is set out by the accompanying claim set. In the context of the claims, the terms "comprising" or "comprises" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

Annex—Exemplary Specific Implementation

In the present annex, the exemplary embodiment described in connection with FIG. 13 is described in larger detail. In the present annex, reference to "FIG. 1" refers to FIG. 1 in the article (featuring the present inventors as authors) "Room-temperature mid-infrared single-photon spectral imaging", Nature Photonics 6, 788-793 (2012), which is hereby included by reference in entirety, and particular reference is made to the FIG. 1 of the article and the associated description relating to the setup is included by reference. The only difference with respect to the setup described in connection with FIG. 10 of the present application is that the poling periods in the non-linear crystal have been changed and that the crystal is mounted on a motorized z-stage so that the poling period could be changed quickly. It is furthermore noted, that with respect to FIG. 1 in the article, the present invention comprises the optical component system on the optical axis between a plane suitable for comprising the associated object, such as the associated object, and the non-linear crystal.

The setup comprised diode-pumped solid-state laser which was designed to generate an intense, continuous, $TEM_{00}$, intracavity laser beam. This was achieved using a Nd:$YVO_4$ laser cavity oscillating at 1064 nm, pumped by a 4 W, 808 nm diode (broad-area laser (BAL;) FIG. 1c). A 20-mm-long, 1-mm-thick periodically poled lithium niobate (pp-LN) crystal was placed inside the laser cavity. The pp-LN was phase-matched for sum frequency generation (SFG) between the 1064 nm laser field and the wavelengths of the incoming mid-infrared radiation. Including the intracavity nonlinear crystal, a circulating power of up to 100 W was generated.

This is a standard way of obtaining phase-matching (using periodic poling). By suitable choice of poling period any wavelength can be phase matched. It is noted that any phase-matching mechanism, such as temperature tuning or rotation of nonlinear crystal can be used to obtain phase matching.

The imaging wavelength conversion module consisted of a folded laser cavity formed by mirrors M1-M7 (FIG. 1). All mirrors were high reflection (HR)-coated for 1064 nm. Mirror M7 (plane) was constructed on an undoped YAG substrate with both sides antireflection (AR)-coated for high transmission at 2-4 mm. Mirror M6 (plane) acted as the output coupler for the upconverted image. M6 and M7 were located in a separate compartment to avoid scattered 808 nm pump laser radiation near the nonlinear crystal. The path length between M7 and M3 (radius of curvature, 200 mm) was 202 mm and the path length between M1 and M3 was 156 mm. All mirrors except M3 were plane mirrors. The 0.27 atm % Nd-doped $YVO_4$ crystal had dimensions of 3×3×12 $mm^3$. The 1064 nm laser was pumped by a 4 W BAL at 808 nm. A c.w. intracavity field of 100 W was realized with this system. The nonlinear material was a 5% Mg:O doped lithium niobate crystal (Covesion, custom order). The crystal contained five different poling periods ranging from 21 to 23 mm in steps of 0.5 mm, located side by side. Each poling period had a 1 mm×1 mm aperture. Crystal length was 20 mm. The nonlinear crystal was positioned in a nearcircular beam waist of 180 mm at M7. The temperature of the nonlinear crystal could be controlled with 0.1° C. accuracy from just above room temperature to 200° C. It is relevant to note that the imaged wavelengths change with poling period, as well as with crystal temperature. A computer program was used to calculate the required poling period and corresponding crystal temperature to phase-match a desired wavelength. The oven containing the nonlinear crystal could be translated, allowing for selection of the required poling period. The infrared light was passed through an AR-coated germanium window to remove radiation below ca. 2 mm, before entering the upconverter unit. Inside the nonlinear crystal, the mid-infrared light mixed with the laser beam and was upconverted to the near-visible region, determined by the phase-match condition for the nonlinear process. To remove laser light and unwanted wavelengths, the upconverted radiation was passed through several optical filters before entering the camera. Typically, these filters included a 1064/532 notch filter with ca. 98% transparency at the upconverted wavelengths, combined with 750 nm long-pass and 850 nm short-pass filters. When imaging wavelengths above 4.2 mm, these filters were replaced with long-pass 850 nm and short-pass 900 nm filters. This is relevant, because a given poling period and temperature will simultaneously phasematch wavelengths both above and below 4.2 mm.

The invention claimed is:

1. An up-conversion infrared microscope arranged for imaging an associated object, wherein the up-conversion infrared microscope comprises:
   a non-linear crystal arranged for up-conversion of infrared electromagnetic radiation, the non-linear crystal being placed on an optical axis of the microscope,
   an optical component system being placed on the optical axis between
      a plane configured for comprising the associated object, and
      the non-linear crystal,
   wherein the optical component system comprises:
      an objective optical component having an entrance pupil with a first diameter,
      a primary optical component subsystem comprising:
         a first optical component and/or
         a second optical component,
      which enables forming a first image of a back-focal plane of the objective optical component, wherein the first image is formed in an infinity space on the optical axis of the microscope after the primary optical component subsystem,
      a secondary optical component subsystem comprising:
         a third optical component and/or
         a fourth optical component,
      which enables forming a second image of a back-focal plane of the objective optical component, wherein the second image is formed in an infinity space on the optical axis of the microscope after the secondary optical component subsystem, wherein the optical component system is arranged for forming an external image of the back-focal plane of the objective optical component, wherein the external image is formed in an infinity space on the optical axis after the optical component system, wherein during use a bundle of optical paths extend from the associated object, via the entrance pupil through the optical component system, and through the non-linear crystal, and wherein the non-linear crystal is placed so that the external image is situated within the non-linear crystal or within a distance Dei-nlc from the non-linear crystal given by $$Dei\text{-}nlc = n(D2/D1)(D2+w0)F/(R),$$

wherein

F is a focal length of the objective optical component,
R is a radius of an area of the associated sample which the microscope is arranged for imaging,
w0 is a diameter of the narrow band light, and
n is a refractive index of a medium in the microscope, and wherein an intersection between the bundle of optical paths and a plane comprising the external image defines an area with a second diameter, and wherein the first diameter is larger than the second diameter, and wherein the optical component system comprises:
at least one refractive lens, and/or
at least three curved mirrors.

2. The up-conversion infrared microscope according to claim 1 wherein the first diameter is at least 2 times larger than the second diameter.

3. The up-conversion infrared microscope according to claim 1, wherein the second diameter $D_2$ is less than 3 mm.

4. The up-conversion infrared microscope according to claim 1, wherein the first diameter $D_1$ is at least 3 mm.

5. The up-conversion infrared microscope according to claim 1, wherein the working distance of the microscope is at least as large as the second diameter $D_2$.

6. The up-conversion infrared microscope according to claim 1, wherein the microscope comprises:
an x-y-stage that is motorized, wherein an x-y-plane is parallel to the plane configured for comprising the associated object,
a photo-detector arranged to be able to record an up-converted microscopy image of the associated object,
a controller arranged for controlling the x-y-stage and the photo-detector, so as to obtain a plurality of up-converted scanning images of the associated object, each of which scanning images corresponds to a separate position of the associated object with respect to the optical axis of the microscope.

7. The up-conversion infrared microscope according to claim 1, wherein a first distance from the end of the primary optical component subsystem to the first image of the back focal plane of the objective optical component is smaller than a second distance from the end of the secondary optical component subsystem to the second image of the back focal plane of the objective optical component.

8. The up-conversion infrared microscope according to claim 1, wherein the primary optical component subsystem comprises the first optical component and the second optical component.

9. The up-conversion infrared microscope according to claim 1, wherein the secondary optical component subsystem comprises the third optical component and the fourth optical component.

10. The up-conversion infrared microscope according to claim 1, wherein a primary infinity space is situated along the optical axis between the objective optical component and the primary optical component subsystem, and, wherein the first image is a phase-conserving image of the back focal plane of the objective optical component.

11. The up-conversion infrared microscope according to claim 1, wherein the microscope further comprises:
an eyepiece enabling an associated human observer to visually observe the microscopy image of the associated object through the eyepiece, and/or
a photo-detector, which is capable of detecting the microscopy image of the associated object and converting the microscopy image to corresponding spatially resolved image data.

12. The up-conversion infrared microscope according to claim 1, wherein the up-conversion infrared microscope is arranged so as to enable imaging of the associated object, wherein the associated object is closer to the objective optical component than a first image of the associated object within the microscope.

13. The up-conversion infrared microscope according to claim 1, further comprising a light source, arranged for emitting a beam of narrow band light, onto the non-linear crystal, which beam of narrow band light, during use provides energy for the up-conversion.

14. The up-conversion infrared microscope according to claim 1, further comprising a light source, arranged for emitting a beam of narrow band light, onto the non-linear crystal, which beam of narrow band light, is arranged for having a diameter of $w_0$ at the non-linear crystal.

15. The up-conversion infrared microscope according to claim 1, wherein the bundle of optical paths extends from the associated object when the associated object is being placed
on the optical axis of the microscope, and
in the plane configured for comprising the associated object which plane is coinciding with a front focal plane of the optical component system.

16. The up-conversion infrared microscope according to claim 1, further comprising the associated object.

17. A method of using the microscope according to claim 1 for providing up-converted EMR so as to form a microscopy image based on the up-converted EMR and/or for obtaining spectral information from the associated object comprising analyzing an associated object with the microscope of claim 1.

18. A method for providing forming a microscopy image of an associated object wherein the microscopy image is based on infrared electromagnetic radiation emitted from the object, the method comprising:
redirecting electromagnetic radiation from the associated object using an optical component system being placed on an optical axis between a plane configured for comprising the associated object, and a non-linear crystal, the optical component system comprising:
an objective optical component having an entrance pupil with a first diameter,
a primary optical component subsystem comprising a first optical component and/or a second optical component, which enables forming a first image of a back-focal plane of the objective optical component, wherein the first image is formed in an infinity space on the optical axis of the microscope after the primary optical component subsystem, a secondary optical component subsystem comprising a third optical component and/or a fourth optical component, which enables forming a second image of a back-focal plane of the objective optical component, wherein the second image is formed in an infinity space on the optical axis of the microscope after the secondary optical component subsystem, wherein the optical component system is arranged for forming an external image of a back-focal plane of the objective optical component, wherein the external image is formed in an infinity space on the optical axis after the optical component system, wherein the method further comprises:

up-converting infrared electromagnetic radiation redirected from the optical component system in the non-linear crystal arranged for up-conversion of infrared electromagnetic radiation, the non-linear crystal being placed on the optical axis of the microscope, so as to form up-converted electromagnetic radiation, wherein during use a bundle of optical paths extends from the associated object, via the entrance pupil through the optical component system, and through the non-linear crystal, and wherein the non-linear crystal is placed so that the external image is situated within the non-linear crystal or within a distance Dei-nlc from the non-linear crystal given by $$Dei\text{-}nlc = n(D2/D1)(D2+w0)F/(R),$$

wherein

F is a focal length of the objective optical component,

R is a radius of an area of the associated sample which the microscope is arranged for imaging, w0 is a diameter of the narrow band light, and n is a refractive index of a medium in the microscope, and wherein an intersection between the bundle of optical paths and a plane comprising the external image defines an area with a second diameter, and wherein the first diameter is larger than the second diameter, and wherein the optical component system comprises:

at least one refractive lens, and/or at least three curved mirrors, and wherein the method further comprises:

forming the microscopy image of the associated object.

19. A method for generating one or more monochromatic images according to the method of claim 18, comprising:

scanning the associated object, and obtaining a plurality of up-converted scanning images of the associated object, each of which scanning images corresponds to a separate position of the associated object with respect to the optical axis of the microscope, and then generating each of the one or more monochromatic images of the associated object at one or more separate wavelengths by:

for each of the scanning images, collecting intensity information from spatial regions in the scanning image of the associated object, which spatial regions are corresponding to the wavelength of the monochromatic image, assigning an intensity value to pixels in the monochromatic image of the associated object, said intensity value in each of said pixels being based on the intensity information from a subset of the spatial regions in the scanning image of the associated object, which subset of the spatial regions corresponds to a position of the pixel in the monochromatic image of the associated object.

* * * * *